(12) United States Patent
Dash

(10) Patent No.: US 12,056,102 B2
(45) Date of Patent: Aug. 6, 2024

(54) IDENTIFYING RENAMES AND DELETIONS IN A STORAGE SYSTEM

(71) Applicant: Rubrik, Inc., Palo Alto, CA (US)

(72) Inventor: Prasanta Rangan Dash, San Jose, CA (US)

(73) Assignee: Rubrik, Inc., Palo Alto, CA (US)

( * ) Notice: Subject to any disclaimer, the term of this patent is extended or adjusted under 35 U.S.C. 154(b) by 6 days.

(21) Appl. No.: 17/891,007

(22) Filed: Aug. 18, 2022

(65) Prior Publication Data
US 2024/0061820 A1  Feb. 22, 2024

(51) Int. Cl.
G06F 16/215 (2019.01)
G06F 16/22 (2019.01)
G06F 16/23 (2019.01)
G06F 16/2457 (2019.01)
G06F 16/25 (2019.01)

(52) U.S. Cl.
CPC ........ *G06F 16/215* (2019.01); *G06F 16/2282* (2019.01); *G06F 16/2358* (2019.01); *G06F 16/24573* (2019.01); *G06F 16/252* (2019.01)

(58) Field of Classification Search
None
See application file for complete search history.

(56) References Cited

U.S. PATENT DOCUMENTS

| | | | | |
|---|---|---|---|---|
| 11,016,855 B2 * | 5/2021 | Adduri | ................ | G06F 11/1451 |
| 11,113,148 B2 * | 9/2021 | Dain | ..................... | G06F 16/285 |
| 11,113,238 B2 * | 9/2021 | Dain | ....................... | G06F 16/27 |
| 11,176,000 B2 * | 11/2021 | Dain | ................... | G06F 11/3034 |
| 11,256,673 B2 * | 2/2022 | Bedadala | ............ | G06F 16/2365 |
| 11,294,871 B2 * | 4/2022 | Attarde | ................. | G06F 16/278 |
| 11,341,106 B2 * | 5/2022 | Attarde | ................. | G06F 16/215 |
| 11,461,280 B2 * | 10/2022 | Kaushik | .............. | G06F 11/2094 |
| 11,468,014 B2 * | 10/2022 | Kaushik | .................. | G06F 16/27 |
| 11,500,847 B2 * | 11/2022 | Shomo | ................ | G06F 16/2358 |
| 11,526,476 B2 * | 12/2022 | Zhang | ................... | G06F 21/604 |
| 11,604,761 B2 * | 3/2023 | Khandkar | ........... | G06F 11/2094 |
| 11,663,177 B2 * | 5/2023 | McPherson | ......... | G06F 16/2282 |
| | | | | 707/609 |
| 11,663,178 B2 * | 5/2023 | Nara | ...................... | G06F 16/217 |
| | | | | 707/692 |
| 11,676,072 B1 * | 6/2023 | Chandrasekharan | ... | G06F 18/23 |
| | | | | 706/12 |

(Continued)

*Primary Examiner* — Kim T Nguyen
(74) *Attorney, Agent, or Firm* — Holland & Hart LLP

(57) ABSTRACT

A data management system (DMS) may receive entries corresponding to files and directories of a storage system that changed within a time period. The received entries may include metadata associated with the changed files and directories. The DMS may identify one or more directories that were renamed or deleted within the time period by analyzing the metadata from the received entries. The DMS may identify descendent directories and descendent files corresponding to the one or more renamed or deleted directories. The DMS may update path identifiers associated with the descendent directories and the descendent files based on the metadata from the received entries. The DMS may generate an updated index file based on updating the path identifiers for the descendent directories and the descendent files. The described techniques may enable the DMS to identify renames and deletions with greater efficiency, among other benefits.

20 Claims, 14 Drawing Sheets

(56) References Cited

U.S. PATENT DOCUMENTS

| | | | |
|---|---|---|---|
| 11,755,590 B2* | 9/2023 | Yelheri | G06F 16/24573 |
| | | | 707/722 |
| 11,755,603 B1* | 9/2023 | Venkatesan | G06F 16/248 |
| | | | 706/15 |
| 11,892,991 B2* | 2/2024 | Bedadala | G06F 16/2365 |
| 2015/0277802 A1* | 10/2015 | Oikarinen | G06F 3/0689 |
| | | | 711/114 |
| 2016/0179711 A1* | 6/2016 | Oikarinen | G06F 13/18 |
| | | | 710/40 |
| 2021/0342316 A1* | 11/2021 | McPherson | G06F 16/2282 |
| 2022/0138207 A1* | 5/2022 | Yelheri | G06F 16/289 |
| | | | 707/722 |
| 2022/0164387 A1* | 5/2022 | Patel | G06F 16/13 |
| 2023/0147671 A1* | 5/2023 | Narulkar | G06F 16/1748 |
| | | | 707/692 |
| 2023/0315606 A1* | 10/2023 | Zdornov | G06F 16/125 |
| | | | 709/224 |
| 2024/0061820 A1* | 2/2024 | Dash | G06F 16/2358 |

\* cited by examiner

Directory Key File 305

| Key | Value |
|---|---|
| 0312480206052021 | /b/y/ |
| 100403203212022 | /a/b/ |
| 3029384707182020 | /c/a/ |
| 5647382810081999 | /d/e/f/ |
| 6930923894328923 | /g/ |

330-a
330-b

Change List Information 310

| Event Type | inode | crtime | mtime | size | ... | Path |
|---|---|---|---|---|---|---|
| Create | 03124802 | 06052021 | 05262022 | 321 kB | ... | /e/x/ |
| Create | 23124802 | 06052021 | 07032021 | 567 kB | ... | /b/x/o.pdf |
| Delete | 30293847 | 07182020 | 09142020 | 143 kB | ... | /c/a/ |
| Delete | 56473828 | 10081999 | 10102003 | 1.1 MB | ... | /d/e/f/ |
| Create | 56473828 | 10081999 | 10102003 | 1.1 MB | ... | /l/m/n/ |
| Modify | 64681012 | 11112011 | 04132019 | 709 kB | ... | /a/y.doc |
| Modify | 78320492 | 12092019 | 12102019 | 286 kB | ... | /y/b/ |

Change Directory Key Table 315

| Event Type | Key | Value |
|---|---|---|
| Create | 0312480206052021 | /e/x/ |
| Delete | 3029384707182020 | /c/a/ |
| Delete | 5647382810081999 | /d/e/f/ |
| Create | 5647382810081999 | /l/m/n/ |

330-c
330-d
330-e

Change Directory Mapping Table 320

| Event Type | Key | Old Path | New Path |
|---|---|---|---|
| Rename | 0312480206052021 | /b/y/ | /e/x/ |
| Delete | 3029384707182020 | /c/a/ | |
| Rename | 5647382810081999 | /d/e/f/ | /l/m/n/ |

330-f
330-g

Derived Path Mapping Table 325

| Event Type | Key | Old Path | New Path |
|---|---|---|---|
| Rename | 0312480206052021 | /b/y/ | /e/x/ |
| Rename | 0312481306052021 | /b/y/o/ | /e/x/o/ |
| Delete | 100403203212022 | /c/a/ | |
| Delete | 100406605152022 | /c/a/m/ | |
| Rename | 5647382810081999 | /d/e/f/ | /l/m/n/ |
| Rename | 5647392510102000 | /d/e/f/i/ | /l/m/n/i/ |

IDENTIFYING RENAMES AND DELETIONS IN A STORAGE SYSTEM

FIELD OF TECHNOLOGY

The present disclosure relates generally to data management, and more specifically to identifying renames and deletions in a storage system.

BACKGROUND

A data management system (DMS) may be employed to manage data associated with one or more computing systems. The data may be generated, stored, or otherwise used by the one or more computing systems, examples of which may include servers, databases, virtual machines, cloud computing systems, file systems (e.g., network-attached storage (NAS) systems), or other data storage or processing systems. The DMS may provide data backup, data recovery, data classification, or other types of data management services for data of the one or more computing systems. Improved data management may offer improved performance with respect to reliability, speed, efficiency, scalability, security, or ease-of-use, among other possible aspects of performance.

BRIEF DESCRIPTION OF THE DRAWINGS

FIGS. 3 and 4 illustrate examples of data schemes that support identifying renames and deletions in a storage system according to one or more aspects of the present disclosure.

DETAILED DESCRIPTION

Figure 1:
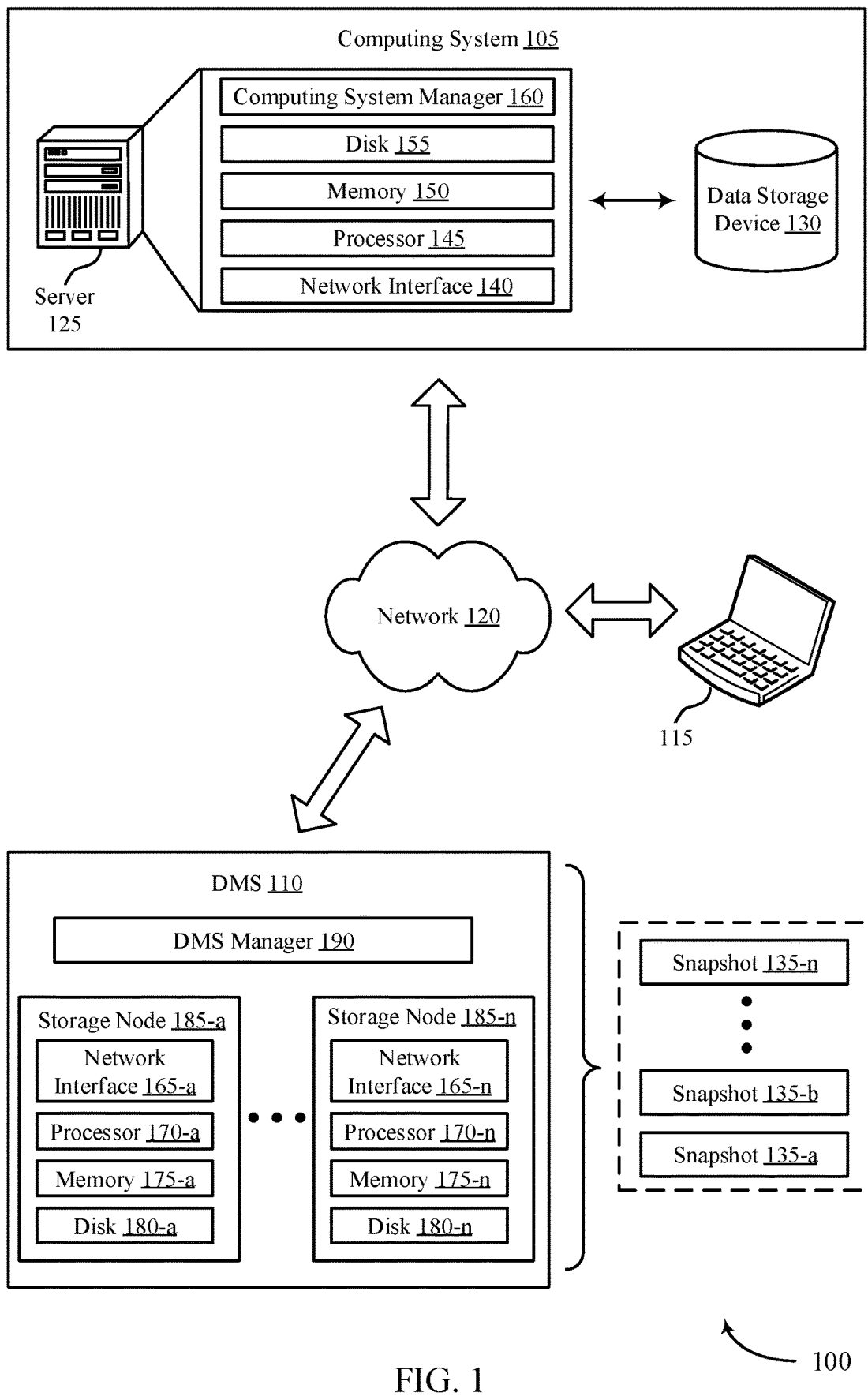
FIGS. 1 and 2 illustrate examples of computing environments that support identifying renames and deletions in a storage system according to one or more aspects of the present disclosure.

A data management system (DMS) may use various application programming interfaces (APIs) to help identify which files and directories of a storage system have changed in a given time period. These APIs may provide the DMS with change list information that indicates directories and files of the storage system that were changed (modified, created, deleted) within a specific time period. The DMS may use the change list information obtained through a vendor-specific API to ensure that a replica (e.g., backup, restore) version of the storage system accurately reflects the current state of the storage system.

In some cases, however, changing the path of a parent (high-level) directory may change the paths of hundreds or thousands of child (low-level) directories and files that descend from the parent directory. The change list information provided to the DMS may not account for such changes. To identify which child directories and files have changed (as a result of changes made to the paths of parent directories), the DMS may be required to execute a prohibitive number of API calls or file scans, which may result in higher processing overhead and increased latency. Thus, existing techniques may not be suitable for storage systems with large numbers of files and directories.

The techniques described herein support a more efficient and scalable approach for updating the path identifiers of directories and files that were renamed or deleted in a given time period. For example, if a DMS receives change list information for a storage system (by invoking an API), the DMS may use metadata from the change list information to identify which directories and files of the storage system were changed within a time period. More specifically, the DMS may analyze the metadata and identify correlated creation and deletion events (or other pertinent event details), which the DMS may use to identify renames and deletions. After identifying renamed or deleted directories, the DMS may use various algorithms described herein to efficiently identify descendent (e.g., child) directories and files corresponding to the deleted or renamed directories. Accordingly, the DMS may update path identifiers for the directories and files that were renamed or deleted within the time period.

In some examples, the DMS may use one or more intermediate (e.g., supplemental, auxiliary) data structures to efficiently identify descendent files and directories that were renamed or deleted. The DMS may concurrently parse these intermediate data structures (tables, files, stacks, queues) and perform comparisons between various entries to determine which files and directories have been deleted or renamed within a given time period. After determining updated path identifiers for all deleted and renamed files and directories, the DMS may generate an updated index file that reflects the current state of the storage system. The updated index file may include updated path identifiers for renamed files and directories, and may exclude files and directories that were deleted.

Aspects of the present disclosure may be implemented to realize one or more of the following advantages. The described techniques may enable a DMS to identify renames and deletions in a storage system with greater processing efficiency and reduced latency. For example, the described techniques may enable a DMS to process changes more efficiently (e.g., with fewer API calls) by using change list information obtained via an API and one or more intermediate data structures to identify files and directories of the storage system that were renamed or deleted within a time period. As a result, the DMS may allocate fewer processing resources to generating and updating index files associated with the storage system, which may enable the DMS to provide backup and restore services with lower processing overhead and decreased latency, among other benefits. Though some aspects of the present disclosure are described in the context of network-attached storage (NAS) systems, it is to be understood that the techniques described herein may be applicable to any type of storage system (e.g., file system).

Aspects of the disclosure are initially described in the context of computing environments and data schemes that support identifying renames and deletions in a storage system. Aspects of the disclosure are further described in the context of flowcharts and process flows that support identifying renames and deletions in a storage system. Aspects of the disclosure are further illustrated by and described with reference to block diagrams and flowcharts that relate to identifying renames and deletions in a storage system.

FIG. 1 illustrates an example of a computing environment 100 that supports identifying renames and deletions in a storage system according to one or more aspects of the present disclosure. The computing environment 100 may include a computing system 105, a DMS 110, and one or more computing devices 115, which may be in communication with one another via a network 120. The computing system 105 may generate, store, process, modify, or otherwise use associated data, and the DMS 110 may provide one or more data management services for the computing system 105. For example, the DMS 110 may provide a data backup service, a data recovery service, a data classification service, a data transfer or replication service, one or more other data management services, or any combination thereof for data associated with the computing system 105.

The network 120 may allow the one or more computing devices 115, the computing system 105, and the DMS 110 to communicate (e.g., exchange information) with one another. The network 120 may include aspects of one or more wired networks (e.g., the Internet), one or more wireless networks (e.g., cellular networks), or any combination thereof. The network 120 may include aspects of one or more public networks or private networks, as well as secured or unsecured networks, or any combination thereof. The network 120 also may include any quantity of communications links and any quantity of hubs, bridges, routers, switches, ports or other physical or logical network components.

A computing device 115 may be used to input information to or receive information from the computing system 105, the DMS 110, or both. For example, a user of the computing device 115 may provide user inputs via the computing device 115, which may result in commands, data, or any combination thereof being communicated via the network 120 to the computing system 105, the DMS 110, or both. Additionally or alternatively, a computing device 115 may output (e.g., display) data or other information received from the computing system 105, the DMS 110, or both. A user of a computing device 115 may, for example, use the computing device 115 to interact with one or more user interfaces (e.g., graphical user interfaces (GUIs)) to operate or otherwise interact with the computing system 105, the DMS 110, or both. Though one computing device 115 is shown in FIG. 1, it is to be understood that the computing environment 100 may include any quantity of computing devices 115.

A computing device 115 may be a stationary device (e.g., a desktop computer or access point) or a mobile device (e.g., a laptop computer, tablet computer, or cellular phone). In some examples, a computing device 115 may be a commercial computing device, such as a server or collection of servers. And in some examples, a computing device 115 may be a virtual device (e.g., a virtual machine). Though shown as a separate device in the example computing environment of FIG. 1, it is to be understood that in some cases a computing device 115 may be included in (e.g., may be a component of) the computing system 105 or the DMS 110.

The computing system 105 may include one or more servers 125 and may provide (e.g., to the one or more computing devices 115) local or remote access to applications, databases, or files stored within the computing system 105. The computing system 105 may further include one or more data storage devices 130. Though one server 125 and one data storage device 130 are shown in FIG. 1, it is to be understood that the computing system 105 may include any quantity of servers 125 and any quantity of data storage devices 130, which may be in communication with one another and collectively perform one or more functions ascribed herein to the server 125 and data storage device 130.

A data storage device 130 may include one or more hardware storage devices operable to store data, such as one or more hard disk drives (HDDs), magnetic tape drives, solid-state drives (SSDs), storage area network (SAN) storage devices, or network-attached storage (NAS) devices. In some cases, a data storage device 130 may comprise a tiered data storage infrastructure (or a portion of a tiered data storage infrastructure). A tiered data storage infrastructure may allow for the movement of data across different tiers of the data storage infrastructure between higher-cost, higher-performance storage devices (e.g., SSDs and HDDs) and relatively lower-cost, lower-performance storage devices (e.g., magnetic tape drives). In some examples, a data storage device 130 may be a database (e.g., a relational database), and a server 125 may host (e.g., provide a database management system for) the database.

A server 125 may allow a client (e.g., a computing device 115) to download information or files (e.g., executable, text, application, audio, image, or video files) from the computing system 105, to upload such information or files to the computing system 105, or to perform a search query related to particular information stored by the computing system 105. In some examples, a server 125 may act as an application server or a file server. In general, a server 125 may refer to one or more hardware devices that act as the host in a client-server relationship or a software process that shares a resource with or performs work for one or more clients.

A server 125 may include a network interface 140, processor 145, memory 150, disk 155, and computing system manager 160. The network interface 140 may enable the server 125 to connect to and exchange information via the network 120 (e.g., using one or more network protocols). The network interface 140 may include one or more wireless network interfaces, one or more wired network interfaces, or any combination thereof. The processor 145 may execute computer-readable instructions stored in the memory 150 in order to cause the server 125 to perform functions ascribed herein to the server 125. The processor 145 may include one or more processing units, such as one or more central processing units (CPUs), one or more graphics processing units (GPUs), or any combination thereof. The memory 150 may comprise one or more types of memory (e.g., random access memory (RAM), static random access memory (SRAM), dynamic random access memory (DRAM), read-only memory (ROM), electrically erasable programmable read-only memory (EEPROM), Flash, etc.). Disk 155 may include one or more HDDs, one or more SSDs, or any combination thereof. Memory 150 and disk 155 may comprise hardware storage devices. The computing system manager 160 may manage the computing system 105 or aspects thereof (e.g., based on instructions stored in the memory 150 and executed by the processor 145) to perform functions ascribed herein to the computing system 105. In some examples, the network interface 140, processor 145, memory 150, and disk 155 may be included in a hardware layer of a server 125, and the computing system manager 160 may be included in a software layer of the server 125. In some cases, the computing system manager 160 may be distributed across (e.g., implemented by) multiple servers 125 within the computing system 105.

In some examples, the computing system 105 or aspects thereof may be implemented within one or more cloud computing environments, which may alternatively be referred to as cloud environments. Cloud computing may refer to Internet-based computing, wherein shared resources, software, and/or information may be provided to one or more computing devices on-demand via the Internet. A cloud environment may be provided by a cloud platform, where the cloud platform may include physical hardware components (e.g., servers) and software components (e.g., operating system) that implement the cloud environment. A cloud environment may implement the computing system 105 or aspects thereof through Software-as-a-Service (SaaS) or Infrastructure-as-a-Service (IaaS) services provided by the cloud environment. SaaS may refer to a software distribution model in which applications are hosted by a service provider and made available to one or more client devices over a network (e.g., to one or more computing devices 115 over the network 120). IaaS may refer to a service in which physical computing resources are used to instantiate one or more virtual machines, the resources of which are made available to one or more client devices over a network (e.g., to one or more computing devices 115 over the network 120).

In some examples, the computing system 105 or aspects thereof may implement or be implemented by one or more virtual machines. The one or more virtual machines may run various applications, such as a database server, an application server, or a web server. For example, a server 125 may be used to host (e.g., create, manage) one or more virtual machines, and the computing system manager 160 may manage a virtualized infrastructure within the computing system 105 and perform management operations associated with the virtualized infrastructure. The computing system manager 160 may manage the provisioning of virtual machines running within the virtualized infrastructure and provide an interface to a computing device 115 interacting with the virtualized infrastructure. For example, the computing system manager 160 may be or include a hypervisor and may perform various virtual machine-related tasks, such as cloning virtual machines, creating new virtual machines, monitoring the state of virtual machines, moving virtual machines between physical hosts for load balancing purposes, and facilitating backups of virtual machines. In some examples, the virtual machines, the hypervisor, or both, may virtualize and make available resources of the disk 155, the memory, the processor 145, the network interface 140, the data storage device 130, or any combination thereof in support of running the various applications. Storage resources (e.g., the disk 155, the memory 150, or the data storage device 130) that are virtualized may be accessed by applications as a virtual disk.

The DMS 110 may provide one or more data management services for data associated with the computing system 105 and may include DMS manager 190 and any quantity of storage nodes 185. The DMS manager 190 may manage operation of the DMS 110, including the storage nodes 185. Though illustrated as a separate entity within the DMS 110, the DMS manager 190 may in some cases be implemented (e.g., as a software application) by one or more of the storage nodes 185. In some examples, the storage nodes 185 may be included in a hardware layer of the DMS 110, and the DMS manager 190 may be included in a software layer of the DMS 110. In the example illustrated in FIG. 1, the DMS 110 is separate from the computing system 105 but in communication with the computing system 105 via the network 120. It is to be understood, however, that in some examples at least some aspects of the DMS 110 may be located within computing system 105. For example, one or more servers 125, one or more data storage devices 130, and at least some aspects of the DMS 110 may be implemented within the same cloud environment or within the same data center.

Storage nodes 185 of the DMS 110 may include respective network interfaces 165, processors 170, memories 175, and disks 180. The network interfaces 165 may enable the storage nodes 185 to connect to one another, to the network 120, or both. A network interface 165 may include one or more wireless network interfaces, one or more wired network interfaces, or any combination thereof. The processor 170 of a storage node 185 may execute computer-readable instructions stored in the memory 175 of the storage node 185 in order to cause the storage node 185 to perform processes described herein as performed by the storage node 185. A processor 170 may include one or more processing units, such as one or more CPUs, one or more GPUs, or any combination thereof. The memory 150 may comprise one or more types of memory (e.g., RAM, SRAM, DRAM, ROM, EEPROM, Flash, etc.). A disk 180 may include one or more HDDs, one or more SDDs, or any combination thereof. Memories 175 and disks 180 may comprise hardware storage devices. Collectively, the storage nodes 185 may in some cases be referred to as a storage cluster or as a cluster of storage nodes 185.

The DMS 110 may provide a backup and recovery service for the computing system 105. For example, the DMS 110 may manage the extraction and storage of snapshots 135 associated with different point-in-time versions of one or more target computing objects within the computing system 105. A snapshot 135 of a computing object (e.g., a virtual machine, a database, a filesystem, a virtual disk, a virtual desktop, or other type of computing system or storage system) may be a file (or set of files) that represents a state of the computing object (e.g., the data thereof) as of a particular point in time. A snapshot 135 may also be used to restore (e.g., recover) the corresponding computing object as of the particular point in time corresponding to the snapshot 135. A computing object of which a snapshot 135 may be generated may be referred to as snappable. Snapshots 135 may be generated at different times (e.g., periodically or on some other scheduled or configured basis) in order to represent the state of the computing system 105 or aspects thereof as of those different times. In some examples, a snapshot 135 may include metadata that defines a state of the computing object as of a particular point in time. For example, a snapshot 135 may include metadata associated with (e.g., that defines a state of) some or all data blocks included in (e.g., stored by or otherwise included in) the computing object. Snapshots 135 (e.g., collectively) may capture changes in the data blocks over time. Snapshots 135 generated for the target computing objects within the computing system 105 may be stored in one or more storage locations (e.g., the disk 155, memory 150, the data storage device 130) of the computing system 105, in the alternative or in addition to being stored within the DMS 110, as described below.

To obtain a snapshot 135 of a target computing object associated with the computing system 105 (e.g., of the entirety of the computing system 105 or some portion thereof, such as one or more databases, virtual machines, or filesystems within the computing system 105), the DMS manager 190 may transmit a snapshot request to the computing system manager 160. In response to the snapshot request, the computing system manager 160 may set the target computing object into a frozen state (e.g. a read-only state). Setting the target computing object into a frozen state may allow a point-in-time snapshot 135 of the target computing object to be stored or transferred.

In some examples, the computing system 105 may generate the snapshot 135 based on the frozen state of the computing object. For example, the computing system 105 may execute an agent of the DMS 110 (e.g., the agent may be software installed at and executed by one or more servers 125), and the agent may cause the computing system 105 to generate the snapshot 135 and transfer the snapshot to the DMS 110 in response to the request from the DMS 110. In some examples, the computing system manager 160 may cause the computing system 105 to transfer, to the DMS 110, data that represents the frozen state of the target computing object, and the DMS 110 may generate a snapshot 135 of the target computing object based on the corresponding data received from the computing system 105.

Once the DMS 110 receives, generates, or otherwise obtains a snapshot 135, the DMS 110 may store the snapshot 135 at one or more of the storage nodes 185. The DMS 110 may store a snapshot 135 at multiple storage nodes 185, for example, for improved reliability. Additionally or alternatively, snapshots 135 may be stored in some other location connected with the network 120. For example, the DMS 110 may store more recent snapshots 135 at the storage nodes 185, and the DMS 110 may transfer less recent snapshots 135 via the network 120 to a cloud environment (which may include or be separate from the computing system 105) for storage at the cloud environment, a magnetic tape storage device, or another storage system separate from the DMS 110.

Updates made to a target computing object that has been set into a frozen state may be written by the computing system 105 to a separate file (e.g., an update file) or other entity within the computing system 105 while the target computing object is in the frozen state. After the snapshot 135 (or associated data) of the target computing object has been transferred to the DMS 110, the computing system manager 160 may release the target computing object from the frozen state, and any corresponding updates written to the separate file or other entity may be merged into the target computing object.

In response to a restore command (e.g., from a computing device 115 or the computing system 105), the DMS 110 may restore a target version (e.g., corresponding to a particular point in time) of a computing object based on a corresponding snapshot 135 of the computing object. In some examples, the corresponding snapshot 135 may be used to restore the target version based on data of the computing object as stored at the computing system 105 (e.g., based on information included in the corresponding snapshot 135 and other information stored at the computing system 105, the computing object may be restored to its state as of the particular point in time). Additionally or alternatively, the corresponding snapshot 135 may be used to restore the data of the target version based on data of the computing object as included in one or more backup copies of the computing object (e.g., file-level backup copies or image-level backup copies). Such backup copies of the computing object may be generated in conjunction with or according to a separate schedule than the snapshots 135. For example, the target version of the computing object may be restored based on the information in a snapshot 135 and based on information included in a backup copy of the target object generated prior to the time corresponding to the target version. Backup copies of the computing object may be stored at the DMS 110 (e.g., in the storage nodes 185) or in some other location connected with the network 120 (e.g., in a cloud environment, which in some cases may be separate from the computing system 105).

In some examples, the DMS 110 may restore the target version of the computing object and transfer the data of the restored computing object to the computing system 105. And in some examples, the DMS 110 may transfer one or more snapshots 135 to the computing system 105, and restoration of the target version of the computing object may occur at the computing system 105 (e.g., as managed by an agent of the DMS 110, where the agent may be installed and operate at the computing system 105).

In response to a mount command (e.g., from a computing device 115 or the computing system 105), the DMS 110 may instantiate data associated with a point-in-time version of a computing object based on a snapshot 135 corresponding to the computing object (e.g., along with data included in a backup copy of the computing object) and the point-in-time. The DMS 110 may then allow the computing system 105 to read or modify the instantiated data (e.g., without transferring the instantiated data to the computing system). In some examples, the DMS 110 may instantiate (e.g., virtually mount) some or all of the data associated with the point-in-time version of the computing object for access by the computing system 105, the DMS 110, or the computing device 115.

In some examples, the DMS 110 may store different types of snapshots, including for the same computing object. For example, the DMS 110 may store both base snapshots 135 and incremental snapshots 135. A base snapshot 135 may represent the entirety of the state of the corresponding computing object as of a point in time corresponding to the base snapshot 135. An incremental snapshot 135 may represent the changes to the state-which may be referred to as the delta—of the corresponding computing object that have occurred between an earlier or later point in time corresponding to another snapshot 135 (e.g., another base snapshot 135 or incremental snapshot 135) of the computing object and the incremental snapshot 135. In some cases, some incremental snapshots 135 may be forward-incremental snapshots 135 and other incremental snapshots 135 may be reverse-incremental snapshots 135. To generate a full snapshot 135 of a computing object using a forward-incremental snapshot 135, the information of the forward-incremental snapshot 135 may be combined with (e.g., applied to) the information of an earlier base snapshot 135 of the computing object along with the information of any intervening forward-incremental snapshots 135, where the earlier base snapshot 135 may include a base snapshot 135 and one or more reverse-incremental or forward-incremental snapshots 135. To generate a full snapshot 135 of a computing object using a reverse-incremental snapshot 135, the information of the reverse-incremental snapshot 135 may be combined with (e.g., applied to) the information of a later base snapshot 135 of the computing object along with the information of any intervening reverse-incremental snapshots 135.

In some examples, the DMS 110 may provide a data classification service, a malware detection service, a data transfer or replication service, backup verification service, or any combination thereof, among other possible data management services for data associated with the computing system 105. For example, the DMS 110 may analyze data included in one or more computing objects of the computing system 105, metadata for one or more computing objects of the computing system 105, or any combination thereof, and based on such analysis, the DMS 110 may identify locations within the computing system 105 that include data of one or more target data types (e.g., sensitive data, such as data subject to privacy regulations or otherwise of particular interest) and output related information (e.g., for display to a user via a computing device 115). Additionally or alternatively, the DMS 110 may detect whether aspects of the computing system 105 have been impacted by malware (e.g., ransomware). Additionally or alternatively, the DMS 110 may relocate data or create copies of data based on using one or more snapshots 135 to restore the associated computing object within its original location or at a new location (e.g., a new location within a different computing system 105). Additionally or alternatively, the DMS 110 may analyze backup data to ensure that the underlying data (e.g., user data or metadata) has not been corrupted. The DMS 110 may perform such data classification, malware detection, data transfer or replication, or backup verification, for example, based on data included in snapshots 135 or backup copies of the computing system 105, rather than live contents of the computing system 105.

In accordance with aspects of the present disclosure, the DMS 110 may receive entries corresponding to files and directories of a storage system that changed within a time period. The received entries may include metadata associated with the changed files and directories. The DMS 110 may identify one or more directories that were renamed or deleted within the time period by analyzing the metadata from the received entries. The DMS 110 may identify descendent directories and descendent files corresponding to the one or more renamed or deleted directories. The DMS 110 may update path identifiers associated with the descendent directories and the descendent files based on the metadata from the received entries. Accordingly, the DMS 110 may generate an updated index file based on updating the path identifiers for the descendent directories and the descendent files.

Aspects of the computing environment 100 may be implemented to realize one or more of the following advantages. The techniques described with reference to FIG. 1 may enable the DMS 110 to identify renames and deletions in a storage system with greater processing efficiency and reduced latency. For example, the described techniques may enable the DMS 110 to process changes more efficiently, such as by using change list information (e.g., as obtained through an API) and various intermediate data structures (e.g., stacks, tables) to identify files and directories of the storage system that were renamed or deleted within a time period. As a result, the DMS 110 may allocate fewer processing resources to generating and updating index files associated with the storage system, which may enable the DMS 110 to update a replica (copy, backup) of the storage system with lower processing overhead and decreased latency.

Figure 2:
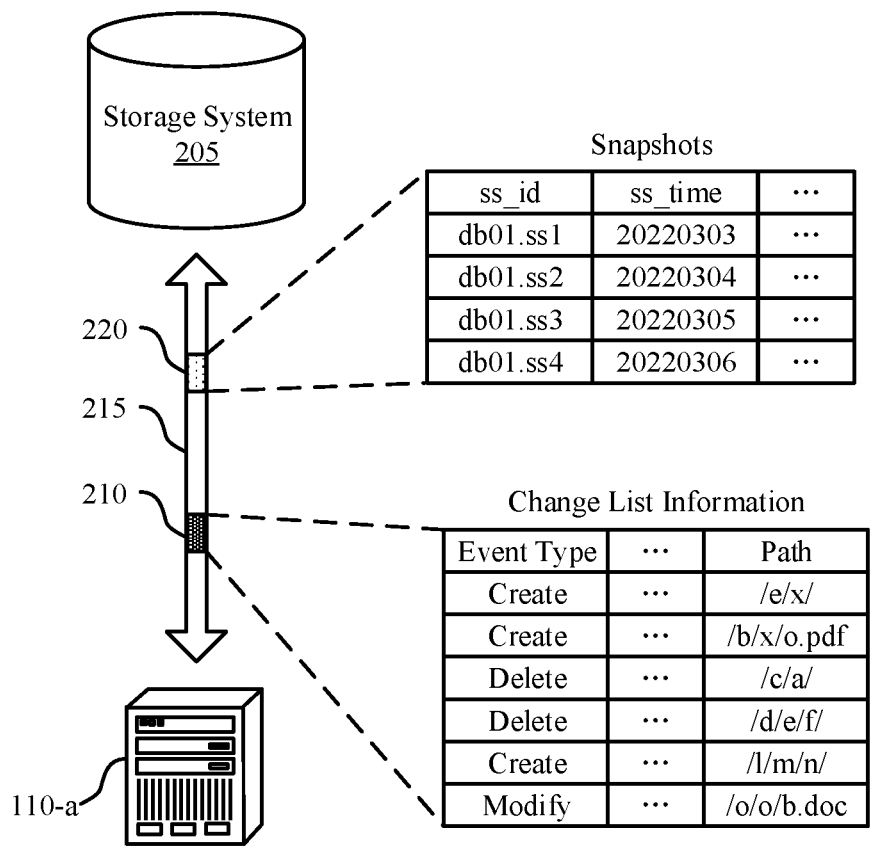

FIG. 2 illustrates an example of a computing environment 200 that supports identifying renames and deletions in a storage system according to one or more aspects of the present disclosure. The computing environment 200 may implement or be implemented by aspects of the computing environment 100. For example, the computing environment 200 may include a DMS 110-*a*, which may be an example of a DMS 110 described with reference to FIG. 1. The computing environment 200 may also include a storage system 205, which may communicate with the DMS 110-*a* via an API 215. In the computing environment 200, the DMS 110-*a* may obtain change list information 210 and snapshots 220 from the storage system 205 via the API 215.

User devices may communicate with the DMS 110-*a* via one or more vendor-specific data management APIs. In turn, the DMS 110-*a* may communicate with the storage system 205 via a storage system vendor-specific API (e.g., the API 215) or a generic API. The DMS 110-*a* may receive the change list information 210 from the storage system 205 via the API 215. The DMS 110-*a* and other actors (user devices) may be examples of API clients that can invoke the API 215. The storage system 205 may be an example of an API server that can process API requests and send API responses to the DMS 110-*a* (or other client devices).

In the example of FIG. 2, the DMS 110-*a* may invoke the API 215 to obtain the snapshots 220 from the storage system 205. The snapshots 220 may be associated with a collection of files and directories (also referred to as file system, volume, or share) in the storage system 205. In other words, the storage system 205 may include one or more collections of files or directories that are exposed to the DMS 110-*a* (or other user devices) as a unit such as a volume or share. API clients can create or delete snapshots 220 of a share, list snapshots 220, or list changes between two snapshots 220. The storage system 205 may generally refer to a collection of files and directories that can be managed as a unit (e.g., share, volume).

Some storage system (e.g., NAS) vendors may support APIs that can identify files and directories that have changed in a given time interval (e.g., between two snapshots 220). When a directory is renamed or deleted, the event may impact all files and directories that descend from the renamed or deleted path. However, vendor APIs may only indicate the top-level directory impacted by a rename or delete event. To identify descendent files and directories impacted by these changes, the DMS 110-*a* may be required to traverse (e.g., parse, iterate, scan) paths in a storage system snapshot. Scanning for impacted directories in shared storage of a storage system may result in inefficient I/O resource utilization, higher metadata scan times, and greater storage system loads. Given the potential for cascaded (e.g., nested) renames and create or delete operations, determining impacted descendent files and directories may be a non-trivial process. Also, the layout of index files provided by vendor APIs may not be conducive to identifying changes made to files and directories.

Aspects of the computing environment 200 may support techniques for reducing (e.g., eliminating) path traversal and improving the efficiency of identifying renames and deletions in the storage system 205. The techniques described with reference to FIG. 2 may enable the DMS 110-*a* to efficiently identify impacted files and directories using logic that can scale to large datasets (e.g., datasets that include hundreds of millions of files). In accordance with aspects of the present disclosure, the DMS 110-*a* may identify paths that have been renamed, collect (e.g., aggregate) a list of directories that have been deleted or renamed, identify descendent directories that have been deleted or renamed, identify files that have been renamed as a result of directory renames, and generate an updated (e.g., new) index file based on a previous index file and one or more intermediate data structures (tables, stacks, files).

The change list information 210 may indicate directories and files of the storage system 205 that have changed between two snapshots 220. More specifically, the change list information 210 may include metadata associated with directories and files that were modified, created, or deleted between two snapshots 220. The metadata may include, for example, an identification number (e.g., inode), a creation time (e.g., crtime), a change event type (e.g., modify, create, delete), or any other information related to directories or files of the storage system 205 that have changed in a given time period.

The DMS 110-a may use the change list information 210, one or more intermediate tables or files derived from the change list information 210, the snapshots 220, one or more intermediate tables or files derived from the snapshots 220, or a combination thereof to identify files and directories of the storage system 205 that have been renamed or deleted within a time period. The DMS 110-a may identify these renamed or deleted files and directories by identifying renamed or deleted directories, identifying descendent directories associated with the renamed or deleted directories, and identifying descendent files associated with the renamed or deleted directories. Accordingly, the DMS 110-a may determine updated path identifiers for the renamed or deleted files and directories, and may generate an updated index file with the updated path identifiers.

FIG. 3 illustrates an example of a data scheme 300 that supports identifying renames and deletions in a storage system according to one or more aspects of the present disclosure. The data scheme 300 may implement or be implemented by aspects of the computing environment 100 or the computing environment 200. For example, the data scheme 300 may be implemented by a DMS 110, as described with reference to FIGS. 1 and 2. The data scheme 300 may include a directory key file 305, change list information 310, a change directory key table 315, a change directory mapping table 320, and a derived path mapping table 325. The tables and files illustrated in the example of FIG. 3 may include one or more entries. For example, the directory key file 305 may include an entry 330-a and an entry 330-b, the change directory key table 315 may include an entry 330-c, an entry 330-d, and an entry 330-e, and the change directory mapping table 320 may include an entry 330-f and an entry 330-g.

The directory key file 305 may be derived from a previous snapshot. The directory key file 305 may include directory entries, and may have two fields (a key field and a value field). Entries in the directory key file 305 may be sorted according to the key field. The change directory key table 315 may be derived from the change list information 310, which may include an event type field, an identification number (inode) field, a creation time (crtime) field, a modification time (mtime) field, a size field, and a path field. However, it is to be understood that the change list information 310 (as well as the other tables and files illustrated in the example of FIG. 3) may include any number of fields and other pertinent metadata. In some examples, a DMS (e.g., the DMS 110-a described with reference to FIG. 2) may use intermediate tables to identify renames or deletions in a storage system. These intermediate tables may be stored in memory only (e.g., not persistently). In contrast, information from previous snapshots (such as the directory key file 305) may be stored persistently as a file.

As described herein, a DMS may receive the change list information 310 via a vendor-specific API (e.g., the API 215 described with reference to FIG. 2). The change list information 310 may include entries associated with files and directories that have changed within a time period (e.g., between two snapshots). Each entry in the change list information 310 may include metadata such as an event type field, an identification number (e.g., inode) field, a creation time (e.g., crtime) field, or a path identifier field, among other examples. Entries in the change list information 310 may correspond to create events, delete events, or modify events. Different NAS providers may use different mechanisms for reporting rename events. For example, renaming a path from A to B may return two different entries (e.g., delete A and create B) with the same inode and crtime values. However, some arrays may not return crtime information (or may return a value of zero). Thus, while some NAS vendors (also referred to as NAS providers) may use inode+crtime as a unique key, it is to be understood that different storage systems may use different schemes. As such, different fields may be used to generate unique keys (and identify correlated events) within a storage system. For example, some NAS vendors may alter the inode number of deleted entries (e.g., a specific bit may be set to 1). In such examples, the inode number after masking (setting the specific bit to 0) may be used as a unique key.

After generating the change directory key table 315 by iterating through the change list information 310, the DMS may iterate through the change directory key table 315 and identify entries with correlated (e.g., identical) keys. For example, the DMS may determine that the entry 330-d and the entry 330-e have matching keys (5647382810081999). Since the entry 330-d corresponds to a delete operation and the entry 330-e corresponds to a create operation, the DMS may determine that the entry 330-d and the entry 330-e collectively indicate a rename event for the associated directory. Accordingly, the DMS may add the entry 330-g to the change directory mapping table 320. The entry 330-g may list the path from the delete entry (/d/e/f/) as the old (previous) path and the path from the create entry (/l/m/n/) as the new (updated) path.

In some examples, a delete entry may not be returned if an ancestor (e.g., parent) directory of a path is deleted after the path is renamed. The DMS may generate the change directory key table 315 to correctly process these entries. As described herein, the change directory key table 315 may include directory entries that are indexed by a combination of mode and crtime (or other vendor-specific key values), and may include a path identifier in the value field. The directory key file 305 and the change directory key table 315 may be sorted according to key values. If the DMS determines that a key of a created directory is present in the directory key file 305 (from a previous snapshot), the DMS may determine that the path was renamed. Accordingly, the DMS may use the path from the previous snapshot as the original (e.g., old) path, and may use the created path as the new path in the current snapshot. For example, if the key of the entry 330-c (0312480206052021) is present in the entry 330-a of the directory key file 305, the DMS may add the entry 330-f to the change directory mapping table 320. The entry 330-f may list the path from the entry 330-a (/b/y/) as the old path and the path from the entry 330-c (/e/x/) as the new path.

The DMS may use the change directory mapping table 320 to identify descendent directories (e.g., child directories, sub-directories) of the storage system that have been renamed or deleted. The DMS may record entries for the renamed or deleted descendent directories (as well as the parent directories of the renamed or deleted descendent directories) in the derived path mapping table 325. As illustrated in the example of FIG. 3, the derived path mapping table 325 may include an event type field, a key field, an old (e.g., previous) path field, and a new (e.g., current) path field. If, for example, the DMS identifies one or more child directories that descend from a renamed or deleted directory, the DMS may process these descendent directories in the same manner as the renamed or deleted directory. The new path field may not be applicable for deleted directories. As such, the new path field may not be set for deleted directories. Alternatively, the new path field for deleted directories may have a placeholder value of " " or N/A.

Figure 4:
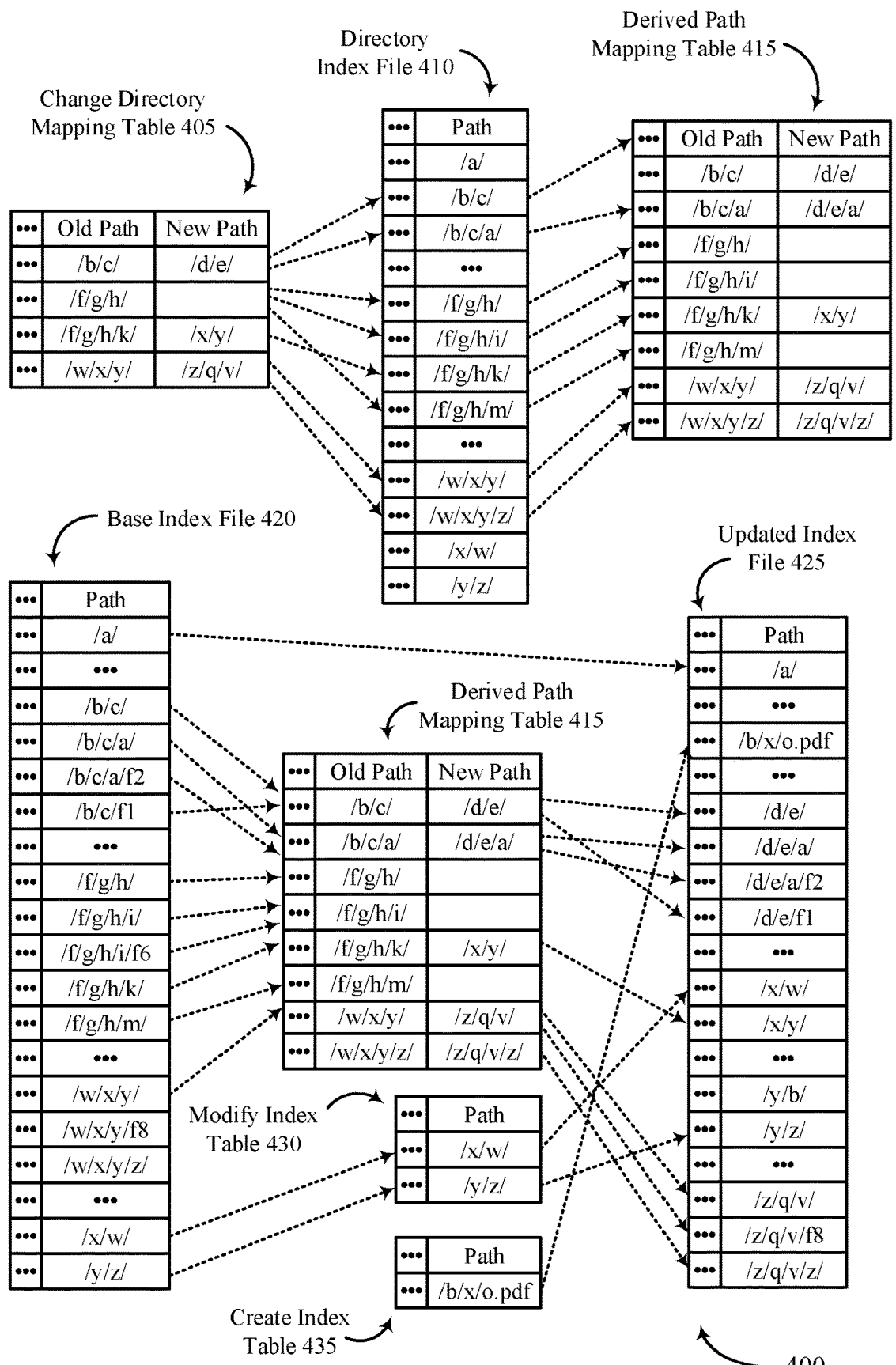

FIG. 4 illustrates an example of a data scheme 400 that supports identifying renames and deletions in a storage system according to one or more aspects of the present disclosure. The data scheme 400 may implement or be implemented by aspects of the computing environment 100 or the computing environment 200. For example, the data scheme 400 may be implemented by a DMS 110, as described with reference to FIGS. 1 and 2. The data scheme 400 may include a change directory mapping table 405 and a derived path mapping table 415, which may be examples of the change directory mapping table 320 and the derived path mapping table 325 described with reference to FIG. 3. The data scheme 400 may also include a directory index file 410, a base index file 420, an updated index file 425, a modify index table 430, and a create index table 435.

In the example of FIG. 4, a DMS (e.g., the DMS 110-a described with reference to FIG. 2) may create a stack and compare entries from the change directory mapping table 405 and the directory index file 410 until the DMS has processed all entries in the change directory mapping table 405 and the directory index file 410. First, the DMS may compare /b/c/ (from the change directory mapping table 405) with /a/ (from the directory index file 410). Since /a/ is less than /b/c/ (lexicographically), the DMS may not create a mapping between these entries. Subsequently, the DMS may check the stack. If the stack is empty, no action is required. Next, the DMS compares /b/c/ (from the change directory mapping table 405) with /b/c/ (from the directory index file 410). Since this comparison results in a match, the DMS may store a mapping between the two paths (/b/c/ and /d/e/) in the stack and the derived path mapping table 415.

Having processed entries from the change directory mapping table 405 and the directory index file 410, the DMS may process the following entries. For example, the DMS may compare /f/g/h/ (from the change directory mapping table 405) with /b/c/a/ (from the directory index file 410). Since /b/c/a is lexicographically smaller than /f/g/h/, the DMS may check the stack (rather than the mapping in the derived path mapping table 415). If the top entry in the stack (/b/c/) is an ancestor of the current entry (/b/c/a/), the mapping is relevant. In such examples, the DMS may add the mapping between the two paths (/b/c/a/ and /d/e/a/) to the derived path mapping table 415. However, the stack may not change because the DMS may not push derived entries to the stack.

Accordingly, the DMS may compare /f/g/h/ (from the change directory mapping table 405) with /c/d/ (from the directory index file 410). Since /c/d/ is lexicographically smaller than /f/g/h/, the DMS may check the stack. If the top entry in the stack (/b/c/) is not an ancestor of the current path (/c/d/), the DMS may pop the top entry from the stack and check the stack again. Since the stack previously had one entry (and is now empty), the DMS may determine that the directory /c/d/ was unchanged. Next, the DMS may compare the current entry from the change directory mapping table 405 to the following entry in the directory index file 410 (which has a path of /f/g/h/). Since this comparison results in a match, the DMS pushes /f/g/h/ to the stack and the derived path mapping table 415.

The DMS may compare /f/g/h/k/ from the change directory mapping table 405 to /f/g/h/i/ from the directory index file 410. The DMS may process the latter entry (/f/g/h/i/) first by comparing /f/g/h/i/ to the current stack entry (f/g/h/). Accordingly, the DMS may generate a delete entry (mapping to " " or N/A). This entry (/f/g/h/i/) is a derived entry, and may not be pushed to the stack. Accordingly, the DMS may compare /f/g/h/k/ to the next entry in the directory index file 410 (/f/g/h/k/). Since /f/g/h/k/ is present in both files, the comparison results in a match. As such, the DMS may add an entry to the derived path mapping table 415 and push /f/g/h/k/ to the stack. When processing /w/x/y/ from the change directory mapping table 405 and /f/g/h/m/ from the directory index file 410, the DMS processes /f/g/h/m/ first (since /f/g/h/m/ is lexicographically smaller than /w/x/y/) and defers processing /w/x/y/. The DMS may compare the next entry in the directory index file 410 (/f/g/h/m/) to the top entry in the stack (/f/g/h/k/) and pop the stack entry based on the comparison. Next, the DMS may compare /f/g/h/m/ to the new top entry in the stack (/f/g/h/) and generate a new entry in the derived path mapping table 415 based on the comparison.

Figure 5:
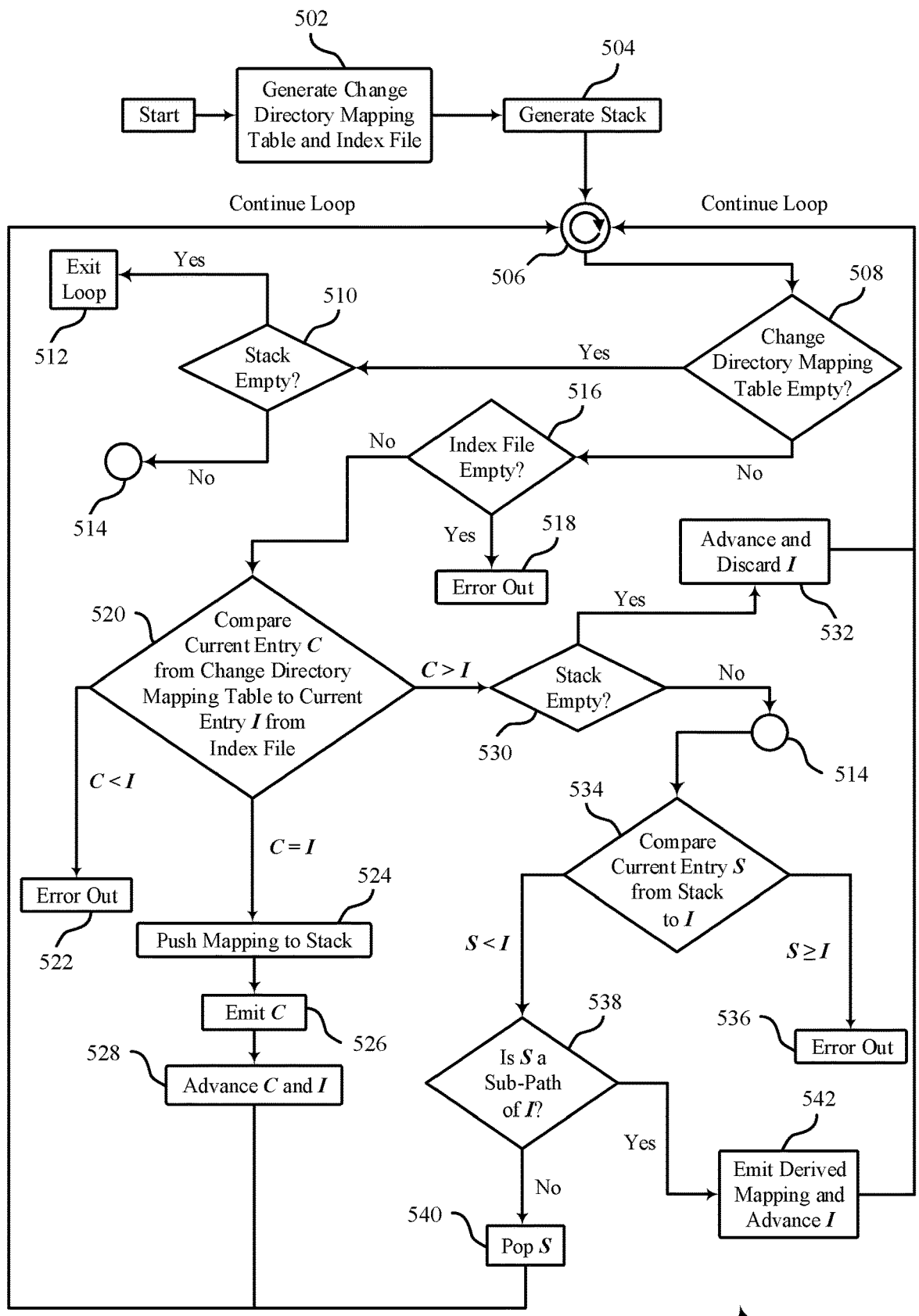
FIGS. 5 and 6 illustrate examples of flowcharts that support identifying renames and deletions in a storage system according to one or more aspects of the present disclosure.

Thus, in some cases, the DMS may advance both the change directory mapping table 405 and the directory index file 410, compare the current entry in the change directory mapping table 405 (/w/x/y/) with the current entry in the directory index file 410 (/w/x/y/), and push a derived mapping (between /w/x/y/ and /z/q/v/) to the derived path mapping table 415 (as this comparison results in a match). In some examples (to limit entries in the stack), the DMS may remove /f/g/h/ and /f/g/h/k/ from the stack before pushing the derived mapping to the stack because these entries are not ancestors of /w/x/y/. More specifically, the DMS may compare the current entries in the stack (/f/g/h/k/ and /f/g/h/) with the current entry in the directory index file 410 (/w/x/y/), check whether /f/g/h/k/ and /f/g/h/ are sub-paths of /w/x/y/, and pop /f/g/h/k/ and /f/g/h/ from the stack after determining that /f/g/h/k/ and /f/g/h/ are not sub-paths of /w/x/y/. In the example of FIG. 5, the DMS may implement this logic by performing the operations of 534, 538, and 540 (or similar variations) between the operations of 520 and 524. Alternatively, the DMS may pop /f/g/h/k/ and /f/g/h/ from the stack after the DMS finishes processing all children of w/x/y/ (e.g., when the DMS determines to pop /w/x/y/ from the stack).

After processing /w/x/y/, the DMS may flag (mark) the processing of change directory mapping table 405 as complete. The DMS may add an entry with the path /w/x/y/z/ to the derived path mapping table 415 because the path /w/x/y/ is present in the stack (even though all entries in the change directory mapping table 405 have been exhausted). When processing /x/w/, the DMS may determine that current stack entries are not ancestors of this path, and may empty the stack. The DMS may then determine that processing is complete, and may refrain from processing subsequent entries in the directory index file 410.

The DMS may then create another stack and compare entries from the base index file 420 and the derived path mapping table 415. The stack may hold directory entries (not file entries). Entries may be added to and removed from the stack. At the end of processing all entries from the base index file 420 and the derived path mapping table 415, the stack may be empty. The base index file 420 may include an entry /b/c/ followed by /b/c/a/, /b/c/a/f2, and /b/c/f1. When the DMS processes /b/c/ from the base index file 420 and the derived path mapping table 415, the DMS may add the mapping (between /b/c/ and /d/e/) to the stack. When processing /b/c/a/ from the base index file 420 and the derived path mapping table 415, the DMS may add another mapping (between /b/c/a/ and /d/e/a/) to the stack.

When the DMS processes /b/c/a/f2 from the base index file 420, the current entry in the derived path mapping table 415 is /f/g/h/, so the DMS checks the stack instead. The containing (parent) directory for the file /b/c/a/f2 is /b/c/a/, which is at the top of the stack. Accordingly, the DMS establishes a derived mapping (between /b/c/a/f2 and /d/e/a/f2). In some implementations, this derived mapping may be stored in the updated index file 425. Alternatively, the derived mapping may be stored in an intermediate file before being consolidated into the updated index file 425. When the DMS processes entry /b/c/f1 from the base index file 420, the containing directory for the file is /b/c/. Since the path of the top entry in the stack (/b/c/a/) is not /b/c/, the DMS may remove the top entry from the stack. The new top entry in the stack has a path of /b/c/, which results in a match. Thus, the DMS may map the path /b/c/f1 to /d/e/f1. The DMS may continue iteratively searching for descendent renames and deletions until the DMS has exhausted entries from the derived path mapping table 415 and the stack is empty.

In some examples, the DMS may also generate a modify index table 430, a create index table 435, and a delete index table (not shown) based on change list information (e.g., the change list information 310 described with reference to FIG. 3) provided by a NAS vendor-specific API. In some cases, an entry from the create index table 435 and an entry from the delete index table may correspond to the same file. In such examples, the DMS may discard the associated entry from the base index file 420 and add the entry from the create index table 435. The DMS may drop entries from the base index file 420 that are present in the delete index table. If, for example, a parent directory is renamed and a descendent file (under the parent directory) is deleted, the DMS may not generate a rename entry for the descendent file.

The DMS may generate the delete index table (also referred to as a delete key table) that includes entries associated with deleted files. These entries may be indexed using mode and crtime (or other vendor-specific indexing mechanisms). The DMS may use these indices to identify correlation events between deleted files and created files (to identify file renames). As illustrated in the example of FIG. 4, the updated index file 425 may include entries from the modify index table 430 (directories and files that were modified), entries from the create index table 435 (files and directories that were created), and one or more entries from the base index file 420 (directories and files that were unchanged).

FIG. 5 illustrates an example of a flowchart 500 that supports identifying renames and deletions in a storage system according to one or more aspects of the present disclosure. The flowchart 500 may implement or be implemented by aspects of the computing environment 100 or the computing environment 200. For example, the flowchart 500 may be implemented by a DMS 110, as described with reference to FIGS. 1 and 2. In the following description of the flowchart 500, the exemplary operations shown may be performed in a different order or at different times. In some examples, other operations may be added to the flowchart 500. Additionally, or alternatively, some operations may be omitted from the flowchart 500. In the example of FIG. 5, a DMS may use various algorithms and data structures to identify descendent directories (e.g., sub-directories) that have been renamed or deleted in a given time period.

At 502, the DMS may generate or otherwise obtain a change directory mapping table (e.g., the change directory mapping table 320 described with reference to FIG. 3) and an index file, which may be an example of the base index file 420 or the directory index file 410 described with reference to FIG. 4. The index file may be retrieved or derived from a previous base snapshot of a storage system (e.g., the storage system 205 described with reference to FIG. 2). At 504, the DMS may generate a stack to hold a mapping between entries in the change directory mapping table and the index file. The stack may have a maximum depth that is determined by a maximum number of nested renames or deletions within files and directories of the storage system. At 506, the DMS may concurrently iterate (loop) through the change directory mapping table and the index file. The DMS may perform different sets of actions for changed and unchanged files.

At 508, the DMS may check to see if the change directory mapping table is empty. If the change directory mapping table is empty, the DMS may check to see if the stack is empty at 510. If the stack is empty, the DMS may exit the loop at 512. If the stack is not empty, the DMS may proceed to 514. If the change directory mapping table is not empty (if there are entries in the change directory mapping table), the DMS may check whether the index file is empty at 516. If the index file is empty, the DMS may error out (throw an error) at 518. However, if the index file is not empty, the DMS may compare the key (old path) of the current entry C in the change directory mapping table with the path of the current entry I in the index file at 520. If this comparison results in C<I, the DMS may error out at 522. If this comparison results in C=I, the DMS may push a mapping (between C and I) to the stack at 524. Accordingly, the DMS may emit C at 526, advance C and I at 528, and continue the loop (by returning to 506).

If the comparison between C and I results in C>I, the DMS may check whether the stack is empty at 530. If the stack is empty, the DMS may advance and discard I at 532. As an example, if the first entry in the change directory mapping table is /b/c/ and the first entry in the index file is /a/ (as illustrated in the example of FIG. 4), the DMS may lexicographically compare /b/c/ to /a/. Since /b/c/ is lexicographically greater than /a/, the comparison results in C>I. However, the DMS may preserve (store, maintain) C so the DMS can compare C with subsequent entries from the index file. For example, if the following entry in the index file has a path of /b/c/, the comparison may result in C=I (after advancing I).

Accordingly, the DMS may continue the loop and return to 506. If the stack is not empty (if there are entries in the stack), the DMS may proceed to 514 and compare the path of the current entry S in the stack to the path of the current entry I in the index file at 534. If this comparison results in S≥I, the DMS may error out at 536. However, if the comparison results in S<I, the DMS may check to see if S is a sub-path of I at 538. More specifically, the DMS may check if the key (old path) of the current stack entry S is a sub-path of the current index file entry I. If S is not a sub-path of I, the DMS may pop S from the stack at 540 and continue the loop by returning to 506. If S is a sub-path of I, the DMS may emit a derived mapping for I (to the stack and a derived path mapping table) and advance I at 542. For example, if S includes a mapping between /b/c/ and /d/e/ and the path of I is /b/c/a/, the DMS may emit a derived mapping between /b/c/a/ and /d/e/a/ to the stack as well as a derived path mapping table (e.g., the derived path mapping table 415 described with reference to FIG. 4). The DMS may derive this mapping from S and I.

Figure 6:
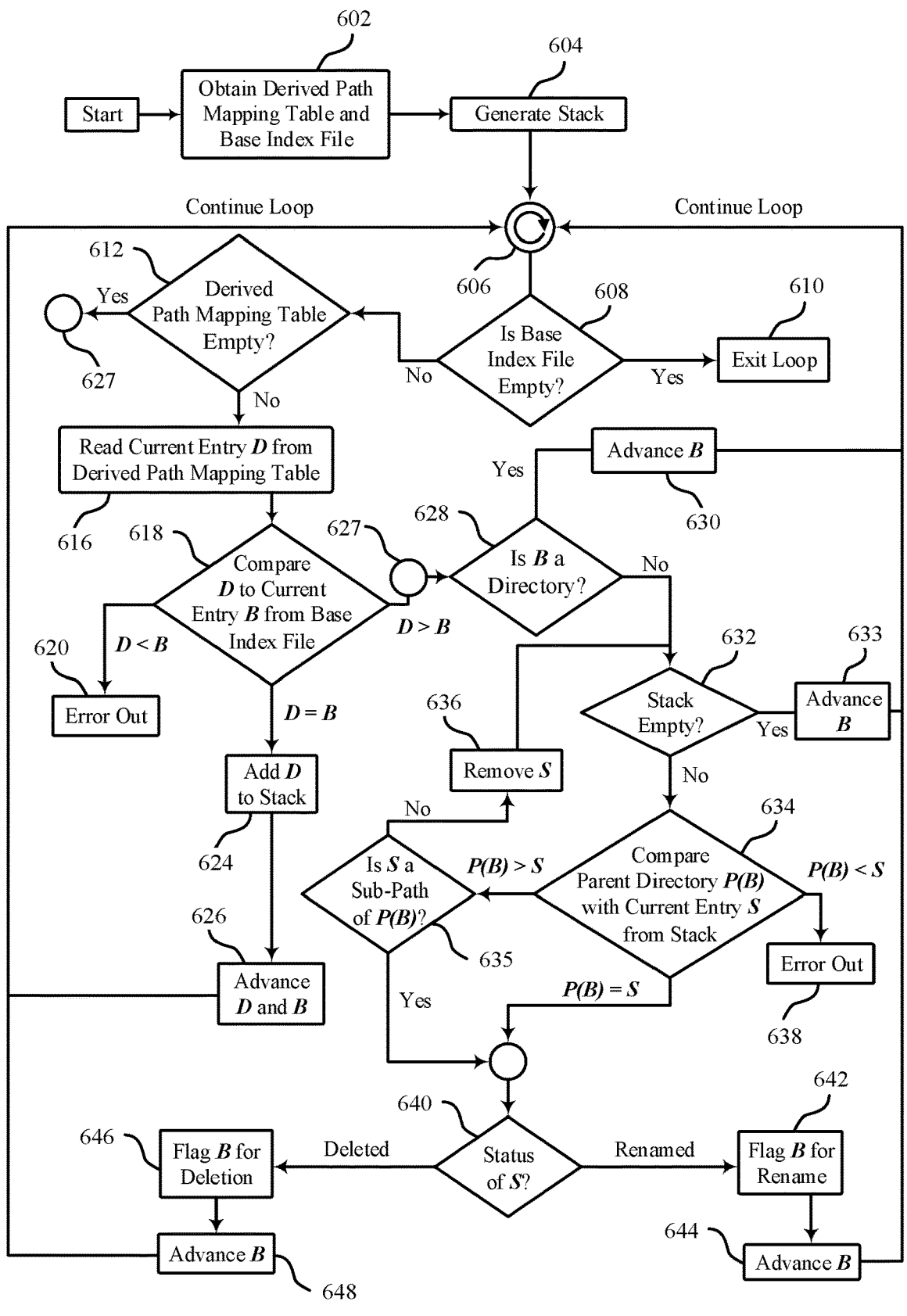

FIG. 6 illustrates an example of a flowchart 600 that supports identifying renames and deletions in a storage system according to one or more aspects of the present disclosure. The flowchart 500 may implement or be implemented by aspects of the computing environment 100 or the computing environment 200. For example, the flowchart 600 may be implemented by a DMS 110, as described with reference to FIGS. 1 and 2. In the following description of the flowchart 600, the exemplary operations shown may be performed in a different order or at different times. In some examples, other operations may be added to the flowchart 600. Additionally, or alternatively, some operations may be omitted from the flowchart 600. In the example of FIG. 6, a DMS may use various algorithms and data structures to identify descendent files that have been renamed or deleted in a given time period.

At 602, the DMS may generate or obtain a derived path mapping table (e.g., the derived path mapping table 415 described with reference to FIG. 4) and a base index file (e.g., the base index file 420 described with reference to FIG. 4). At 604, the DMS may create a stack to hold derived path mappings. At 606, the DMS may concurrently iterate (loop) through the derived path mapping table and the base index file to determine whether a current entry of the base index file has been renamed or deleted. At 608, the DMS may check whether the base index file is empty. If the base index file is empty, the DMS may exit the loop at 610. In some examples, if the DMS is generating an updated index file (e.g., the updated index file 425 described with reference to FIG. 4), there may be unprocessed (e.g., lexicographically greater) entries in a create index table (e.g., the create index table 435 described with reference to FIG. 4) that the DMS may add to the updated index file before exiting the loop at 610. Otherwise (if there are still entries in the base index file), the DMS may check whether the derived path mapping table is empty at 612. If the derived path mapping table is empty, the DMS may proceed to 627.

If the derived path mapping table is not empty (e.g., if there are entries present in the derived path mapping table), the DMS may read the current entry D from the derived path mapping table at 616, and may compare D to the current entry B in the base index file at 618. If this comparison results in D<B, the DMS may error out at 620. Alternatively, if the comparison results in D=B, the DMS may add D to the stack at 624, advance both D and B at 626, and continue the loop by returning to 606. If the comparison results in D>B, the DMS may proceed to 627. In some examples, the DMS may check if the stack is empty at 627. If the stack is empty, the DMS may exit the loop at 610. Otherwise, the DMS may proceed to 628, where the DMS may check whether B is a directory or not. If B is a directory, the DMS may advance B at 630 and continue the loop by returning to 606. If B is not a directory (e.g., if B is a file), the DMS may check whether the stack is empty at 632. If the stack is empty, the DMS may advance B at 633 and continue the loop by returning to 606. In some examples, the DMS may skip all entries in the base index file that are (lexicographically) smaller than D (e.g., using a seek function). D may be a proper subset of B, and may only include existing entries (from a previous snapshot) that were renamed or deleted.

If the stack is not empty (e.g., if there are entries in the stack), the DMS may compare the path of the parent (containing) directory of B (denoted as P(B) in the example of FIG. 6) to the path of the current entry S in the stack at 634. If this comparison results in P(B)<S, the DMS may error out at 638. If the comparison results in P(B)=S, the DMS may check the status of S at 640. If S was renamed and B is not present in a delete index table (not shown), the DMS may flag B as a rename (e.g., generate a rename directive) at 642, advance B at 644, and continue the loop by returning to 606. If S was deleted, the DMS may flag B as a deletion (e.g., generate a delete directive) at 646, advance B at 648, and continue the loop by returning to 606. Thus, the DMS may determine the status of files (e.g., renamed or deleted) based on the status of the containing directories in which these files are located. If the comparison between P(B) and S results in P(B)>S, the DMS may check whether S is a sub-path of P(B) at 635. If S is a sub-path of P(B), the DMS may proceed to 640 and determine the status of S. If S is not a sub-path of P(B), the DMS may remove S from the stack at 636 and return to 632 (checking whether the stack is empty).

The stack entry S may be removed at 636 because knowing whether a directory /x/y/a/ was renamed or deleted may not be required to process descendent files of a directory with /x/y/b/c or /x/y/a2/ as a path identifier. Thus, the directory /x/y/a/ can be removed from the stack. Similarly, if a directory /x/y/z/f1 matches with a directory that has /x/y/z/ as a path identifier, entries that include path identifiers such as /x/y/a/ or /x/p/ or /s/ may be removed from the stack. However, entries with path identifiers such as /x/ or /x/y/ (e.g., ancestor directories) may be kept in the stack. In some examples, entries (e.g., files from the base index file) may be compared bottom up in the stack. For example, a file with /x/z/a/f5 as a path identifier may match with a directory that has /x/z/a/ as a path identifier, and a file with /x/z/f2 as a path identifier may match with a directory that has /x/ as a path identifier. The DMS may implement this procedure by iteratively performing 632, 634, 635, and 636 (e.g., using a loop), popping the top entry S in the stack, and performing a comparison between the new top entry in the stack and the parent directory P(B). When comparing P(B) to S at 634, the DMS may only look for the parent directory of B (not ancestors of B) because the derived path mapping table may include entries for all renamed and deleted descendent directories.

Figure 7:
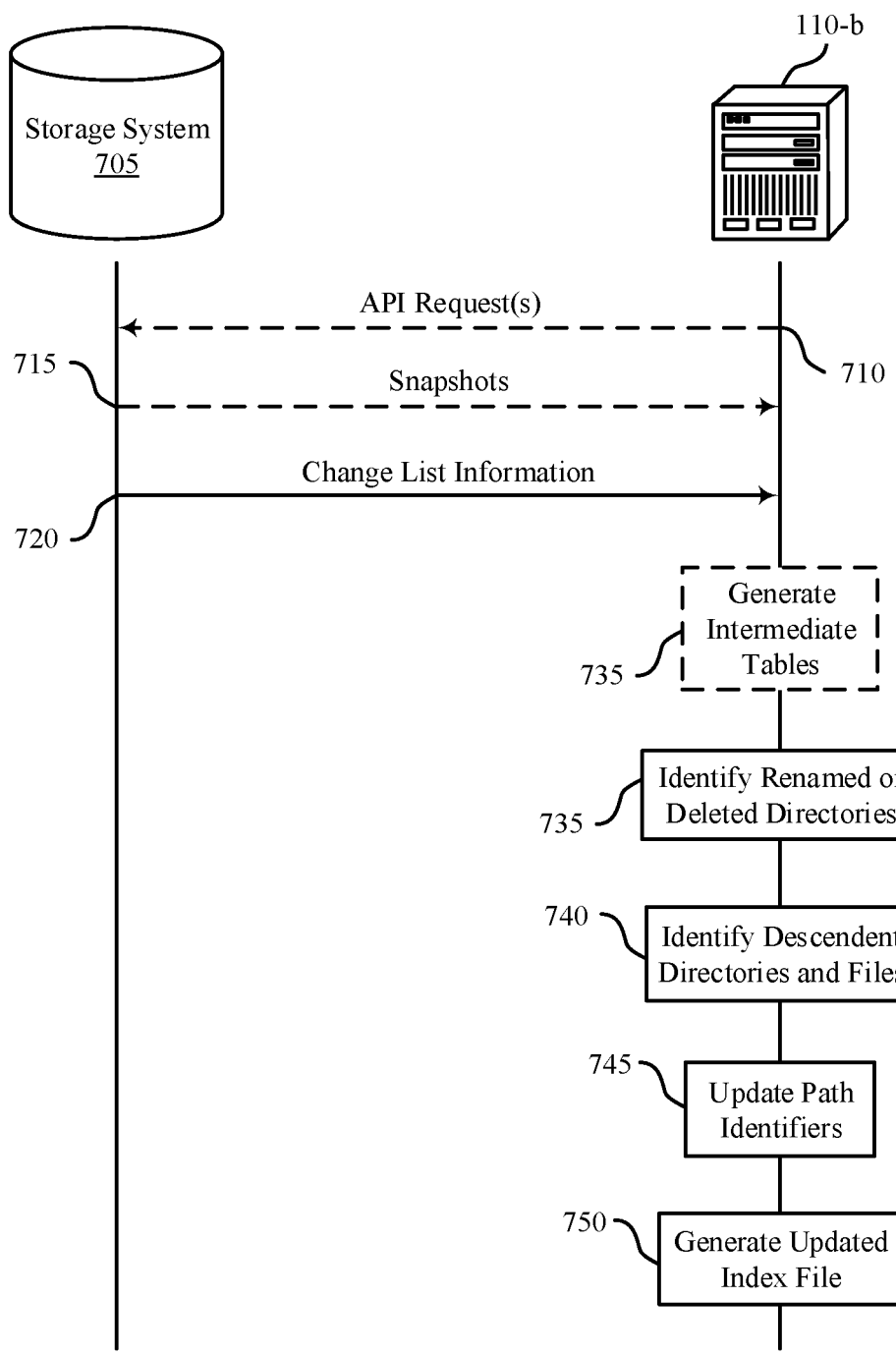
FIG. 7 illustrates an example of a process flow that supports identifying renames and deletions in a storage system according to one or more aspects of the present disclosure.

FIG. 7 illustrates an example of a process flow 700 that supports identifying renames and deletions in a storage system according to one or more aspects of the present disclosure. The process flow 700 may implement or be implemented by aspects of the computing environment 100 or the computing environment 200. For example, the process flow 700 may include a storage system 705 and a DMS 110-b, which may be examples of corresponding systems described with reference to FIGS. 1 and 2. In the following description of the process flow 700, the exemplary operations shown may be performed in a different order or at different times. In some examples, other operations may be added to the process flow 700. Additionally, or alternatively, some operations may be omitted from the process flow 700. In the example of FIG. 7, the DMS 110-b use one or more intermediate data structures (tables, files, stacks) and change list information to identify renames and deletions within the storage system 705.

At 710, the DMS 110-b may invoke a NAS vendor-specific API (e.g., the API 215 described with reference to FIG. 2) and submit one or more API requests to the storage system 705 (e.g., an API server) via the NAS vendor-specific API. In response to these API requests, the DMS 110-b may obtain one or more snapshots (e.g., the snapshots 220 described with reference to FIG. 2) of the storage system 705 at 715. More specifically, the storage system 705 may include one or more collections of files and directories that are exposed to the DMS 110-*b* as a unit (also referred to as a volume or share). The DMS 110-*b* (an API client) may receive one or more snapshots of these collections from the storage system 705 in response to an API request. For example, the DMS 110-*b* may obtain a first snapshot of a share at a first (earlier) time and a second snapshot of the share at a second (later) time.

At 720, the DMS 110-*b* may obtain change list information (e.g., the change list information 310) from the storage system 705 via the NAS vendor-specific API. The change list information may include multiple entries corresponding to files and directories of the storage system 705 that changed within a time period (e.g., between two snapshots). These entries may include metadata associated with the changed files and directories. In some examples, this metadata may include one or more of a file size, a file location, a permission status, a set of related directories or files, a creation time (crtime), a modification time (mtime), a user identifier, or a timestamp associated with the changed files and directories.

At 725, the DMS 110-*b* may generate one or more intermediate data structures (tables, files) based on the change list information and snapshots obtained via the NAS vendor-specific API. For example, the DMS 110-*b* may generate a change directory key table (e.g., the change directory key table 315 described with reference to FIG. 3), a change directory mapping table (e.g., the change directory mapping table 320 described with reference to FIG. 3), a derived path mapping table (e.g., the derived path mapping table 325 described with reference to FIG. 3), a delete index table, a modify index table (e.g., the modify index table 430 described with reference to FIG. 4), a create index table (e.g., the create index table 435 described with reference to FIG. 4), or a combination thereof.

In some examples, the DMS 110-*b* may retrieve one or more index files associated with a previous snapshot of the storage system 705. For example, the DMS 110-*b* may retrieve a directory key file (e.g., the directory key file 305 described with reference to FIG. 3), a base index file (e.g., the base index file 420 described with reference to FIG. 4), a directory index file (e.g., the directory index file 410 described with reference to FIG. 4), or a combination thereof. The directory key file may include key value pairs for directories that were present in the storage system 705 prior to a time period. The base index file may include information (path identifiers, metadata) for files and directories that were present in the storage system 705 prior to the time period. The directory index file may include entries for directories (not files) that were present in the storage system 705 prior to the time period (e.g., when a previous snapshot was obtained).

At 735, the DMS 110-*b* may identify one or more directories that were renamed or deleted within the time period (between two snapshots) based on the metadata in the change list information. In some examples, the DMS 110-*b* may determine that two entries in the change list information correspond to a rename deletion based on identifying a create entry and a delete entry with correlated (identical, matching) keys. Additionally or alternatively, the DMS 110-*b* may determine that an entry from the change list information corresponds to a rename event if a path associated with the entry is present in the directory key file (derived from a previous snapshot). At 740, the DMS 110-*b* may identify a set of descendent (child) directories and a set of descendent files associated with the renamed or deleted directories.

At 745, the DMS 110-*b* may update a first set of path identifiers associated with the identified set of descendent directories and a second set of path identifiers associated with the identified set of descendent files based on the metadata in the change list information. At 750, the DMS 110-*b* may generate an updated index file (e.g., the updated index file 425 described with reference to FIG. 4) based on updating the first and second sets of path identifiers. In some examples, the DMS 110-*b* may generate another file (a diff file) that identifies all changes between a previous base index file and the updated index file. Additionally, or alternatively, the DMS 110-*b* may generate one or both of an updated directory key file or an updated directory index file that can be used for the current snapshot.

Figure 8:
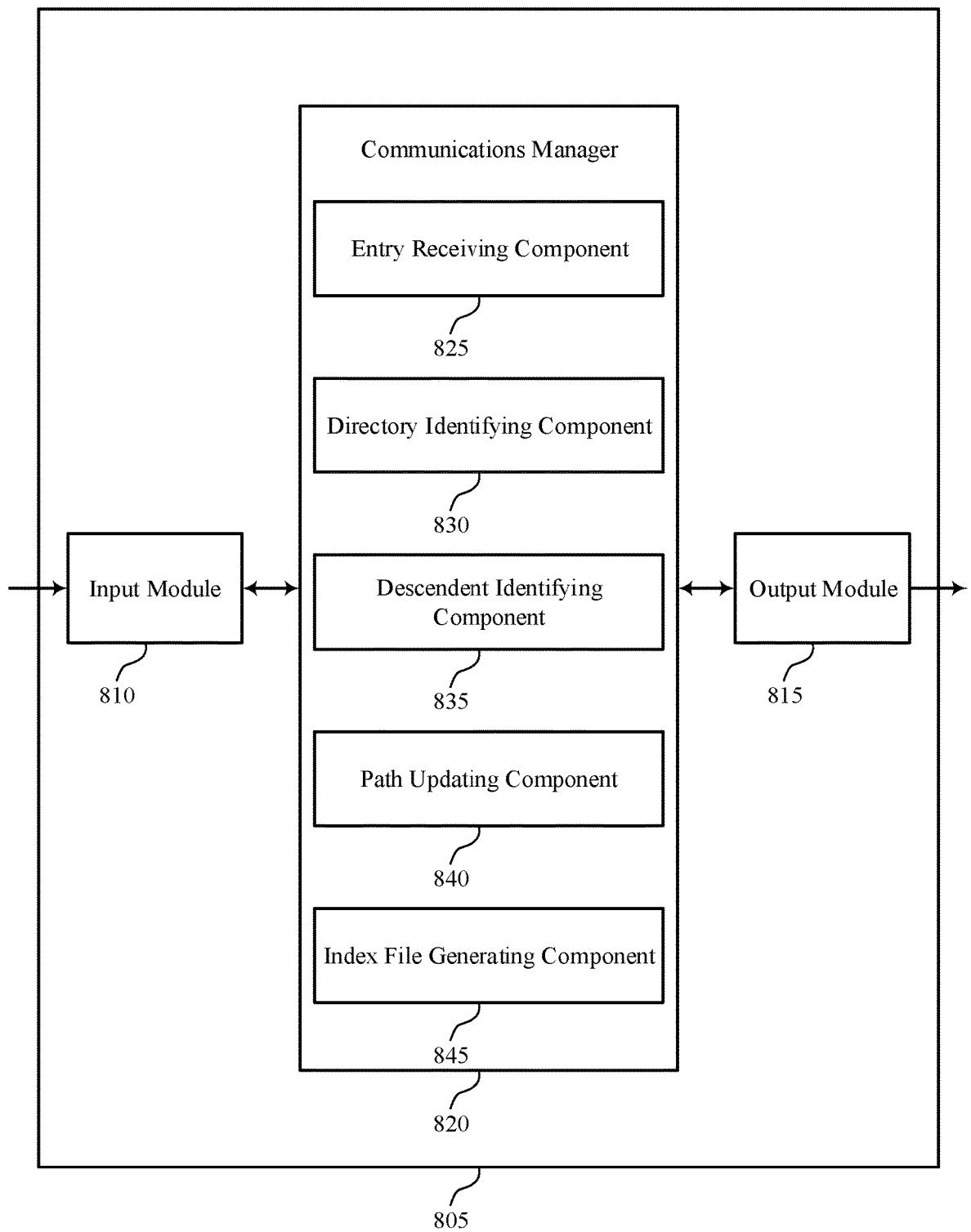
FIG. 8 shows a block diagram of an apparatus that supports identifying renames and deletions in a storage system according to one or more aspects of the present disclosure.

FIG. 8 shows a block diagram 800 of a system 805 that supports identifying renames and deletions in a storage system according to one or more aspects of the present disclosure. In some examples, the system 805 may be an example of aspects of one or more components described with reference to FIG. 1, such as a DMS 110. The system 805 may include an input interface 810, an output interface 815, and a storage manager 820. The system 805 may also include at least one processor. Each of these components may be in communication with one another (e.g., via one or more buses, communications links, communications interfaces, or any combination thereof).

The input interface 810 may manage input signaling for the system 805. For example, the input interface 810 may receive input signaling (e.g., messages, packets, data, instructions, commands, or any other form of encoded information) from other systems or devices. The input interface 810 may send signaling corresponding to (e.g., representative of or otherwise based on) such input signaling to other components of the system 805 for processing. For example, the input interface 810 may transmit such corresponding signaling to the storage manager 820 to support identifying renames and deletions in a storage system. In some cases, the input interface 810 may be a component of a network interface 1015, as described with reference to FIG. 10.

The output interface 815 may manage output signaling for the system 805. For example, the output interface 815 may receive signaling from other components of the system 805, such as the storage manager 820, and may transmit such output signaling corresponding to (e.g., representative of or otherwise based on) such signaling to other systems or devices. In some cases, the output interface 815 may be a component of a network interface 1015, as described with reference to FIG. 10.

The storage manager 820 may include an entry receiving component 825, a directory identifying component 830, a descendent identifying component 835, a path identifying component 840, an index file generating component 845, or any combination thereof. In some examples, the storage manager 820, or various components thereof, may be configured to perform various operations (e.g., receiving, monitoring, transmitting) using or otherwise in cooperation with the input interface 810, the output interface 815, or both. For example, the storage manager 820 may receive information from the input interface 810, send information to the output interface 815, or be integrated in combination with the input interface 810, the output interface 815, or both to receive information, transmit information, or perform various other operations, as described herein.

The storage manager 820 may support data processing at a DMS in accordance with examples disclosed herein. The entry receiving component 825 may be configured as or otherwise support a means for receiving multiple entries corresponding to files and directories of a storage system that changed within a time period, where the multiple entries include metadata associated with the changed files and directories. The directory identifying component 830 may be configured as or otherwise support a means for identifying, based on the metadata from the multiple entries, one or more directories that were renamed or deleted within the time period. The descendent identifying component 835 may be configured as or otherwise support a means for identifying a set of descendent directories and a set of descendent files corresponding to the one or more directories that were renamed or deleted within the time period. The path updating component 840 may be configured as or otherwise support a means for updating a first set of path identifiers associated with the identified set of descendent directories and a second set of path identifiers associated with the identified set of descendent files based on the metadata from the multiple entries. The index file generating component 845 may be configured as or otherwise support a means for generating an updated index file based on updating the first set of path identifiers and the second set of path identifiers.

Figure 9:
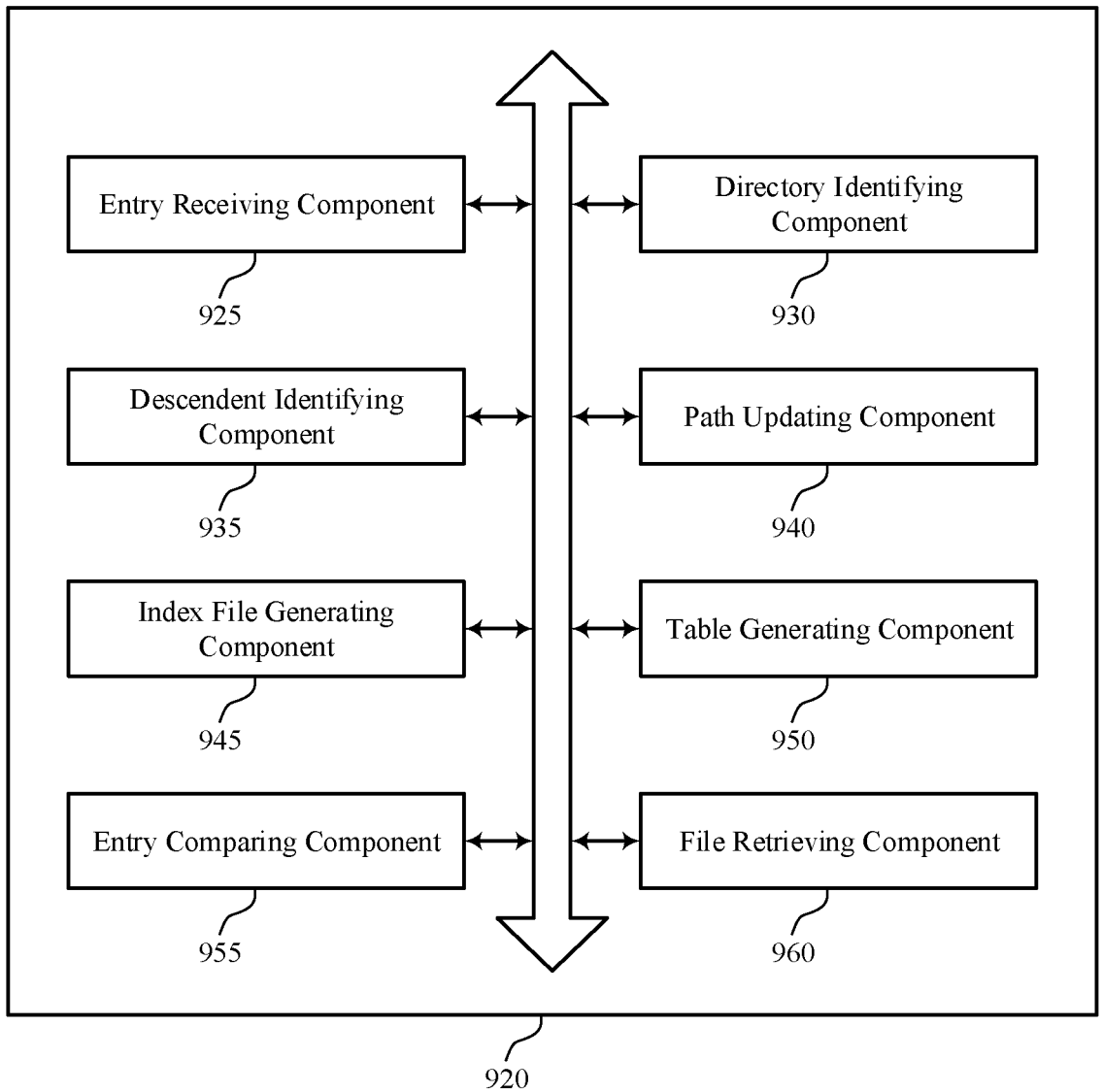
FIG. 9 shows a block diagram of a storage manager that supports identifying renames and deletions in a storage system according to one or more aspects of the present disclosure.

FIG. 9 shows a block diagram 900 of a storage manager 920 that supports identifying renames and deletions in a storage system according to one or more aspects of the present disclosure. The storage manager 920 may be an example of or include aspects of a storage manager 820, as described herein. The storage manager 920, or various components thereof, may be an example of means for performing various aspects of techniques for identifying renames and deletions in a storage system, as described herein. For example, the storage manager 920 may include an entry receiving component 925, a directory identifying component 930, a descendent identifying component 935, a path updating component 940, an index file generating component 945, a table generating component 950, an entry comparing component 955, a file retrieving component 960, or any combination thereof. Each of these components may communicate, directly or indirectly, with one another (e.g., via one or more buses, communications links, communications interfaces, or any combination thereof).

The storage manager 920 may support data processing at a DMS in accordance with examples disclosed herein. The entry receiving component 925 may be configured as or otherwise support a means for receiving multiple entries corresponding to files and directories of a storage system that changed within a time period, where the multiple entries include metadata associated with the changed files and directories. The directory identifying component 930 may be configured as or otherwise support a means for identifying, based on the metadata from the multiple entries, one or more directories that were renamed or deleted within the time period. The descendent identifying component 935 may be configured as or otherwise support a means for identifying a set of descendent directories and a set of descendent files corresponding to the one or more directories that were renamed or deleted within the time period. The path updating component 940 may be configured as or otherwise support a means for updating a first set of path identifiers associated with the identified set of descendent directories and a second set of path identifiers associated with the identified set of descendent files based on the metadata from the multiple entries. The index file generating component 945 may be configured as or otherwise support a means for generating an updated index file based on updating the first set of path identifiers and the second set of path identifiers.

In some examples, the table generating component 950 may be configured as or otherwise support a means for generating a change directory key table based on the multiple entries, where entries of the change directory key table include keys and values associated with the directories of the storage system that changed within the time period. In some examples, to identify the one or more directories that were renamed or deleted within the time period directory, the identifying component 930 may be configured as or otherwise support a means for identifying two or more entries from the change directory key table that have correlated keys. In some examples, the entries of the change directory key table are sorted in ascending or descending order with respect to the keys.

In some examples, the entry comparing component 955 may be configured as or otherwise support a means for determining that the two or more entries correspond to a rename operation based on a first entry of the two or more entries corresponding to a delete operation and a second entry of the two or more entries corresponding to a create operation. In some examples, to generate the updated index file, the index file generating component 945 may be configured as or otherwise support a means for adding a third entry to the updated index file based on the determining, where the third entry includes metadata from one or both of the first entry or the second entry.

In some examples, the keys are derived from identification numbers associated with the directories of the storage system that changed within the time period, creation times associated with the directories of the storage system that changed within the time period, or both. In some examples, the values include path identifiers associated with the directories of the storage system that changed within the time period.

In some examples, the file retrieving component 960 may be configured as or otherwise support a means for retrieving a directory key file with entries that include keys associated with directories that were present in the storage system prior to the time period. In some examples, the entry comparing component 955 may be configured as or otherwise support a means for comparing entries from the directory key file to entries from the change directory key table. In some examples, to identify the one or more directories that were renamed or deleted, the directory identifying component 930 may be configured as or otherwise support a means for identifying, based on the comparing, a first entry from the directory key file and a second entry from the change directory key table that have correlated keys.

In some examples, the updated index file excludes entries associated with the changed files and directories that were deleted within the time period. In some examples, the updated index file includes entries associated with files and directories of the storage system that were unchanged within the time period, entries associated with the changed files and directories that were renamed within the time period, entries associated with the changed files and directories that were created within the time period, and entries associated with the changed files and directories that were modified within the time period.

In some examples, the table generating component 950 may be configured as or otherwise support a means for generating a change directory mapping table that includes entries associated with the one or more directories of the storage system that were renamed or deleted within the time period. In some examples, the entry comparing component 955 may be configured as or otherwise support a means for sorting the entries of the change directory mapping table in ascending or descending lexicographical order. In some examples, to identify the set of descendent directories, the descendent identifying component 935 may be configured as or otherwise support a means for iteratively comparing the sorted entries of the change directory mapping table to entries from a previous index file.

In some examples, the previous index file includes a base index file that includes entries associated with files and directories that were present in the storage system prior to the time period or a directory index file that includes entries associated with directories that were present in the storage system prior to the time period.

In some examples, the entry comparing component 955 may be configured as or otherwise support a means for determining that a first entry in the change directory mapping table and a second entry in the previous index file have identical path identifiers. In some examples, the table generating component 950 may be configured as or otherwise support a means for adding a third entry to a derived path mapping table based on the determining, where the third entry includes metadata from one or both of the first entry or the second entry, and where the set of descendent files are identified using the derived path mapping table.

In some examples, the file retrieving component 960 may be configured as or otherwise support a means for retrieving a base index file that includes entries associated with files and directories that were present in the storage system prior to the time period. In some examples, the table generating component 950 may be configured as or otherwise support a means for generating a derived path mapping table that includes entries associated with the one or more directories that were renamed or deleted and the identified set of descendent directories. In some examples, to identify the set of descendent files, the descendent identifying component 935 may be configured as or otherwise support a means for storing a first set of entries from the derived path mapping table in a data structure and iteratively comparing entries of the base index file to the first set of entries stored in the data structure, a second set of entries from the derived path mapping table, or a combination thereof.

In some examples, the entry comparing component 955 may be configured as or otherwise support a means for removing a current entry from the data structure after processing entries from the base index file that descend from the current entry.

In some examples, the table generating component 950 may be configured as or otherwise support a means for generating, based on the multiple entries, a modify index table that includes entries associated with the changed files and directories that were modified within the time period, where the updated index file includes the entries from the modify index table.

In some examples, the table generating component 950 may be configured as or otherwise support a means for generating, based on the multiple entries, a create index table that includes entries associated with the changed files and directories that were created within the time period, where the updated index file includes the entries from the create index table.

In some examples, the table generating component 950 may be configured as or otherwise support a means for generating, based on the multiple entries, a delete index table that includes entries associated with the changed files and directories that were deleted within the time period, where the updated index file excludes the entries from the delete index table.

In some examples, the file retrieving component 960 may be configured as or otherwise support a means for retrieving a base index file that includes entries associated with files and directories that were present in the storage system prior to the time period, where the updated index file includes entries from the base index file that were unchanged within the time period. In some examples, the metadata indicates one or more of a file size, a file location, a permission status, a set of related directories or files, a creation time, a modification time, a user identifier, or a timestamp associated with the changed files and directories.

Figure 10:
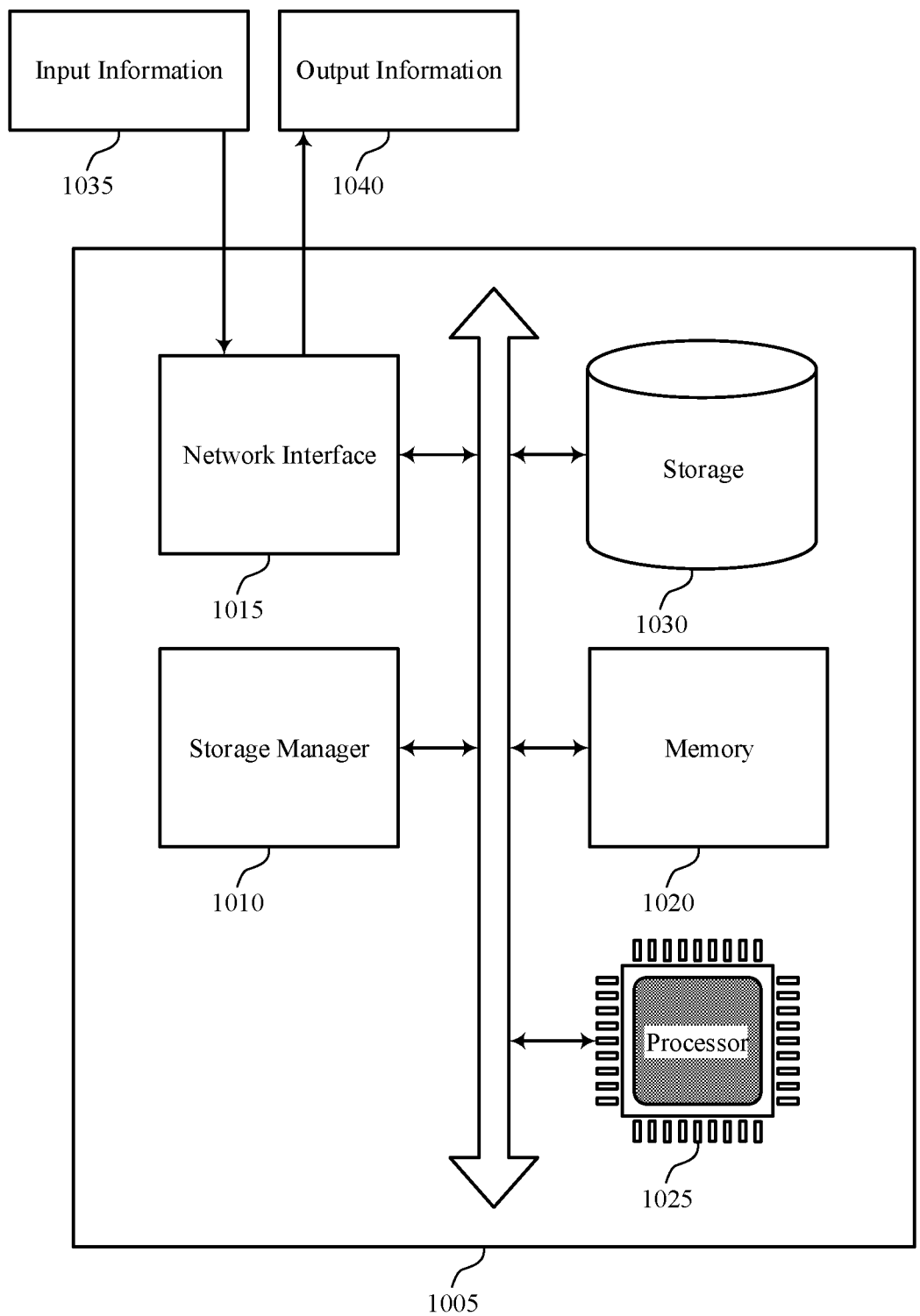
FIG. 10 shows a block diagram of a system including a device that supports identifying renames and deletions in a storage system according to one or more aspects of the present disclosure.

FIG. 10 shows a block diagram 1000 of a system 1005 that supports identifying renames and deletions in a storage system according to one or more aspects of the present disclosure. The system 1005 may be an example of or include aspects of a system 805, as described herein. The system 1005 may include components for data management, including components such as a storage manager 1010, a network interface 1015, memory 1020, processor 1025, and storage 1030. These components may be in electronic communication or otherwise coupled with each other (e.g., operatively, communicatively, functionally, electronically, electrically; via one or more buses, communications links, communications interfaces, or any combination thereof). Additionally, the components of the system 1005 may comprise corresponding physical components or may be implemented as corresponding virtual components (e.g., components of one or more virtual machines). In some examples, the system 1005 may be an example of aspects of one or more components described with reference to FIG. 1, such as a DMS 110.

The network interface 1015 may enable the system 1005 to exchange information (e.g., input information 1035, output information 1040, or both) with other systems or devices (not shown). For example, the network interface 1015 may enable the system 1005 to connect to a network (e.g., a network 120, as described herein). The network interface 1015 may include one or more wireless network interfaces, one or more wired network interfaces, or any combination thereof. In some examples, the network interface 1015 may be an example of may be an example of aspects of one or more components described with reference to FIG. 1, such as one or more network interfaces 165.

Memory 1020 may include RAM, ROM, or both. The memory 1020 may store computer-readable, computer-executable software including instructions that, when executed, cause the processor 1025 to perform various functions described herein. In some cases, the memory 1020 may contain, among other things, a basic input/output system (BIOS), which may control basic hardware or software operation such as the interaction with peripheral components or devices. In some cases, the memory 1020 may be an example of aspects of one or more components described with reference to FIG. 1, such as one or more memories 175.

The processor 1025 may include an intelligent hardware device, (e.g., a general-purpose processor, a digital signal processor (DSP), a CPU, a microcontroller, an application-specific integrated circuit (ASIC), a field programmable gate array (FPGA), a programmable logic device, a discrete gate or transistor logic component, a discrete hardware component, or any combination thereof). The processor 1025 may be configured to execute computer-readable instructions stored in a memory 1020 to perform various functions (e.g., functions or tasks supporting identifying renames and deletions in a storage system). Though a single processor 1025 is depicted in the example of FIG. 10, it is to be understood that the system 1005 may include any quantity of one or more of processors 1025 and that a group of processors 1025 may collectively perform one or more functions ascribed herein to a processor, such as the processor 1025. In some cases, the processor 1025 may be an example of aspects of one or more components described with reference to FIG. 1, such as at least one processor 170.

Storage 1030 may be configured to store data that is generated, processed, stored, or otherwise used by the system 1005. In some cases, the storage 1030 may include one or more HDDs, one or more SDDs, or both. In some examples, the storage 1030 may be an example of a single database, a distributed database, multiple distributed databases, a data store, a data lake, or an emergency backup database. In some examples, the storage 1030 may be an example of one or more components described with reference to FIG. 1, such as one or more network disks 180.

The storage manager 1010 may support data processing at a DMS in accordance with examples disclosed herein. For example, the storage manager 1010 may be configured as or otherwise support a means for receiving multiple entries corresponding to files and directories of a storage system that changed within a time period, where the multiple entries include metadata associated with the changed files and directories. The storage manager 1010 may be configured as or otherwise support a means for identifying, based on the metadata from the multiple entries, one or more directories that were renamed or deleted within the time period. The storage manager 1010 may be configured as or otherwise support a means for identifying a set of descendent directories and a set of descendent files corresponding to the one or more directories that were renamed or deleted within the time period. The storage manager 1010 may be configured as or otherwise support a means for updating a first set of path identifiers associated with the identified set of descendent directories and a second set of path identifiers associated with the identified set of descendent files based on the metadata from the multiple entries. The storage manager 1010 may be configured as or otherwise support a means for generating an updated index file based on updating the first set of path identifiers and the second set of path identifiers.

By including or configuring the storage manager 1010 in accordance with examples, as described herein, the system 1005 may support techniques for identifying renames and deletions in a storage system, which may provide one or more benefits such as, for example, enabling a DMS (e.g., the DMS 110 described with reference to FIG. 1) to process changes more efficiently by using change list information provided via an API and one or more intermediate data structures to identify files and directories of the storage system that were renamed or deleted within a time period. As a result, the DMS may allocate fewer processing resources to generating and updating index files associated with the storage system, which may enable the DMS to update and maintain a replica (copy, backup) of the storage system with lower processing overhead and decreased latency.

Figure 11:
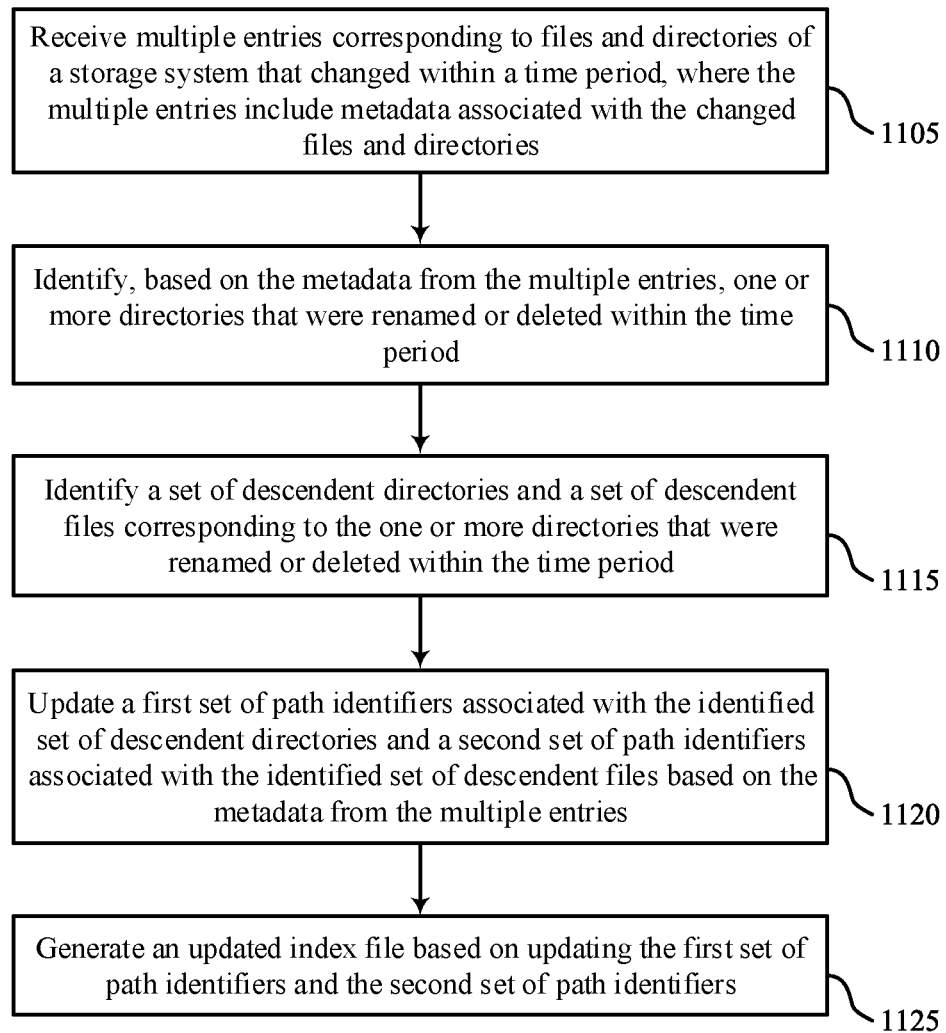
FIGS. 11 through 14 show flowcharts illustrating methods that support identifying renames and deletions in a storage system according to one or more aspects of the present disclosure.

FIG. 11 shows a flowchart illustrating a method 1100 that supports techniques for identifying renames and deletions in a storage system according to one or more aspects of the present disclosure. The operations of the method 1100 may be implemented by a DMS or components thereof. For example, the operations of the method 1100 may be performed by a DMS 110, as described with reference to FIGS. 1 through 10. In some examples, a DMS may execute a set of instructions to control the functional elements of the DMS to perform the described functions. Additionally, or alternatively, the DMS may perform aspects of the described functions using special-purpose hardware.

At 1105, the method may include receiving multiple entries corresponding to files and directories of a storage system that changed within a time period, where the multiple entries include metadata associated with the changed files and directories. The operations of 1105 may be performed in accordance with examples disclosed herein. In some examples, aspects of the operations of 1105 may be performed by an entry receiving component 925, as described with reference to FIG. 9.

At 1110, the method may include identifying, based on the metadata from the multiple entries, one or more directories that were renamed or deleted within the time period. The operations of 1110 may be performed in accordance with examples disclosed herein. In some examples, aspects of the operations of 1110 may be performed by a directory identifying component 930, as described with reference to FIG. 9.

At 1115, the method may include identifying a set of descendent directories and a set of descendent files corresponding to the one or more directories that were renamed or deleted within the time period. The operations of 1115 may be performed in accordance with examples disclosed herein. In some examples, aspects of the operations of 1115 may be performed by a descendent identifying component 935, as described with reference to FIG. 9.

At 1120, the method may include updating a first set of path identifiers associated with the identified set of descendent directories and a second set of path identifiers associated with the identified set of descendent files based on the metadata from the multiple entries. The operations of 1120 may be performed in accordance with examples disclosed herein. In some examples, aspects of the operations of 1120 may be performed by a path updating component 940, as described with reference to FIG. 9.

At 1125, the method may include generating an updated index file based on updating the first set of path identifiers and the second set of path identifiers. The operations of 1125 may be performed in accordance with examples disclosed herein. In some examples, aspects of the operations of 1125 may be performed by an index file generating component 945, as described with reference to FIG. 9.

Figure 12:
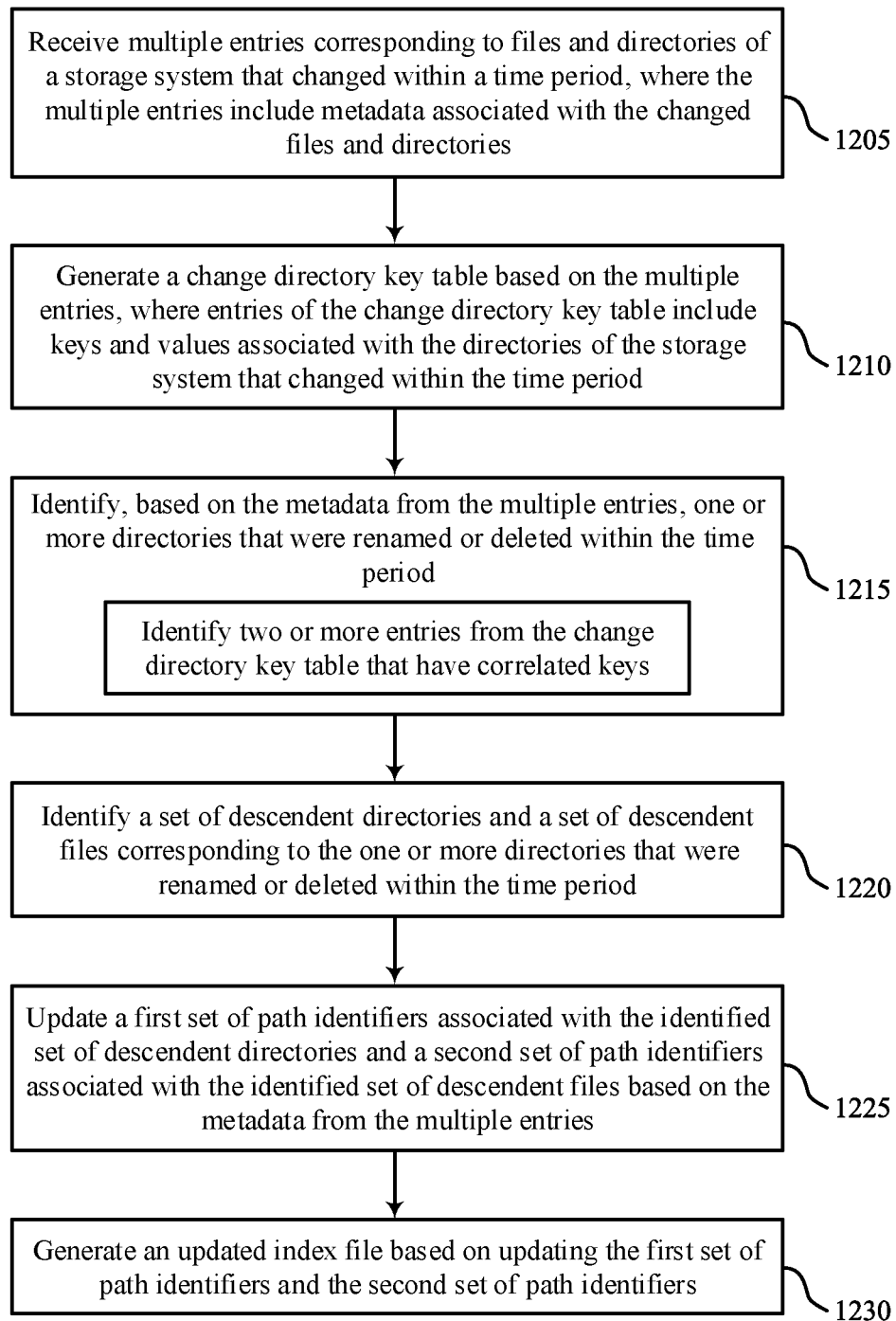

FIG. 12 shows a flowchart illustrating a method 1200 that supports identifying renames and deletions in a storage system according to one or more aspects of the present disclosure. The operations of the method 1200 may be implemented by a DMS or components thereof. For example, the operations of the method 1200 may be performed by a DMS 110, as described with reference to FIGS. 1 through 10. In some examples, a DMS may execute a set of instructions to control the functional elements of the DMS to perform the described functions. Additionally, or alternatively, the DMS may perform aspects of the described functions using special-purpose hardware.

At 1205, the method may include receiving multiple entries corresponding to files and directories of a storage system that changed within a time period, where the multiple entries include metadata associated with the changed files and directories. The operations of 1205 may be performed in accordance with examples disclosed herein. In some examples, aspects of the operations of 1205 may be performed by an entry receiving component 925, as described with reference to FIG. 9.

At 1210, the method may include generating a change directory key table based on the multiple entries, where entries of the change directory key table include keys and values associated with the directories of the storage system that changed within the time period. The operations of 1210 may be performed in accordance with examples disclosed herein. In some examples, aspects of the operations of 1210 may be performed by a table generating component 950, as described with reference to FIG. 9.

At 1215, the method may include identifying, based on the metadata from the multiple entries, one or more directories that were renamed or deleted within the time period by identifying two or more entries from the change directory key table that have correlated keys. The operations of 1215 may be performed in accordance with examples disclosed herein. In some examples, aspects of the operations of 1215 may be performed by a directory identifying component 930, as described with reference to FIG. 9.

At 1220, the method may include identifying a set of descendent directories and a set of descendent files corresponding to the one or more directories that were renamed or deleted within the time period. The operations of 1220 may be performed in accordance with examples disclosed herein. In some examples, aspects of the operations of 1220 may be performed by a descendent identifying component 935, as described with reference to FIG. 9.

At 1225, the method may include updating a first set of path identifiers associated with the identified set of descendent directories and a second set of path identifiers associated with the identified set of descendent files based on the metadata from the multiple entries. The operations of 1225 may be performed in accordance with examples disclosed herein. In some examples, aspects of the operations of 1225 may be performed by a path updating component 940, as described with reference to FIG. 9.

At 1230, the method may include generating an updated index file based on updating the first set of path identifiers and the second set of path identifiers. The operations of 1230 may be performed in accordance with examples disclosed herein. In some examples, aspects of the operations of 1230 may be performed by an index file generating component 945, as described with reference to FIG. 9.

Figure 13:
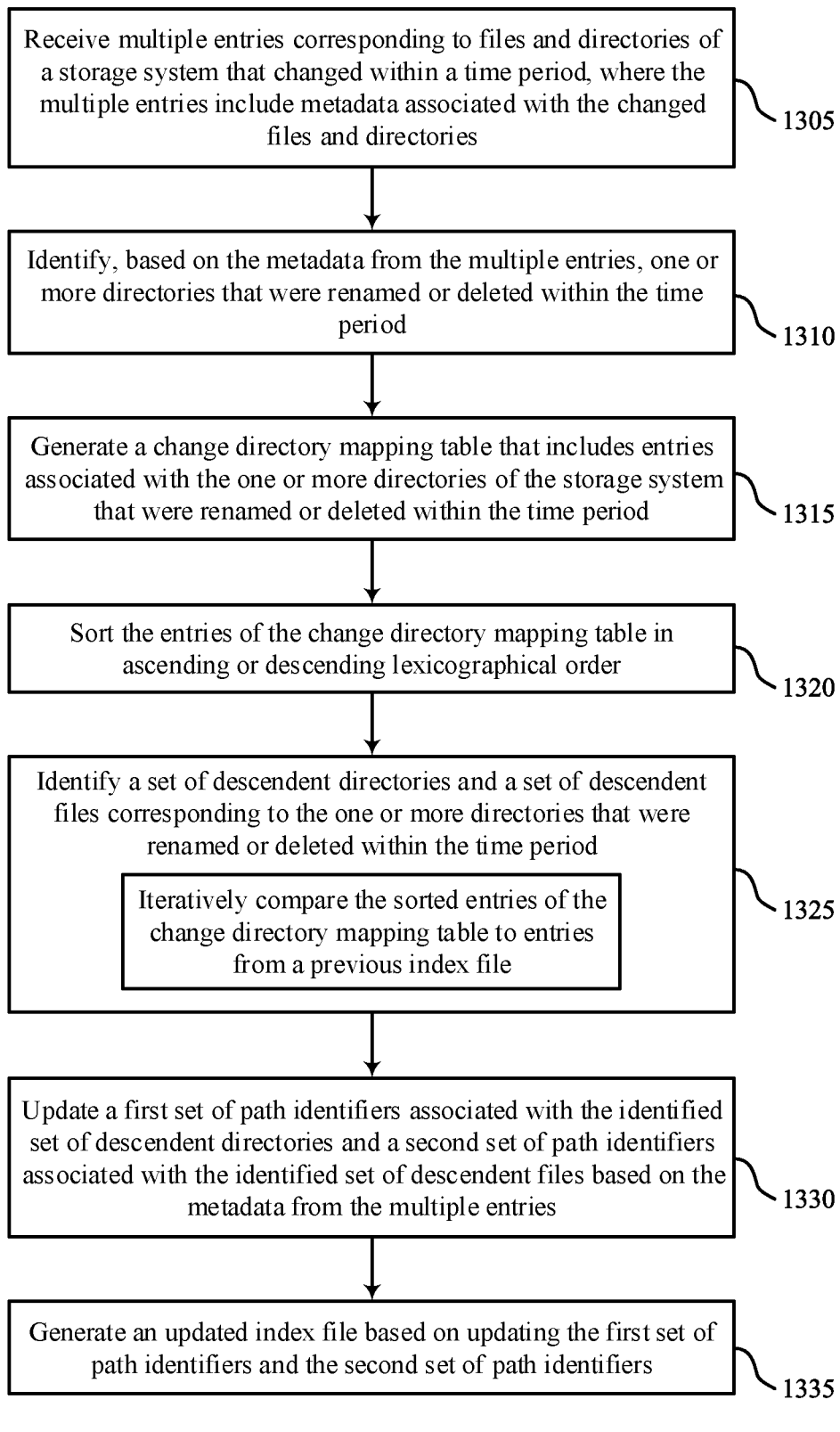

FIG. 13 shows a flowchart illustrating a method 1300 that supports identifying renames and deletions in a storage system according to one or more aspects of the present disclosure. The operations of the method 1300 may be implemented by a DMS or components thereof. For example, the operations of the method 1300 may be performed by a DMS 110, as described with reference to FIGS. 1 through 10. In some examples, a DMS may execute a set of instructions to control the functional elements of the DMS to perform the described functions. Additionally, or alternatively, the DMS may perform aspects of the described functions using special-purpose hardware.

At 1305, the method may include receiving multiple entries corresponding to files and directories of a storage system that changed within a time period, where the multiple entries include metadata associated with the changed files and directories. The operations of 1305 may be performed in accordance with examples disclosed herein. In some examples, aspects of the operations of 1305 may be performed by an entry receiving component 925, as described with reference to FIG. 9.

At 1310, the method may include identifying, based on the metadata from the multiple entries, one or more directories that were renamed or deleted within the time period. The operations of 1310 may be performed in accordance with examples disclosed herein. In some examples, aspects of the operations of 1310 may be performed by a directory identifying component 930, as described with reference to FIG. 9.

At 1315, the method may include generating a change directory mapping table that includes entries associated with the one or more directories of the storage system that were renamed or deleted within the time period. The operations of 1315 may be performed in accordance with examples disclosed herein. In some examples, aspects of the operations of 1315 may be performed by a table generating component 950, as described with reference to FIG. 9.

At 1320, the method may include sorting the entries of the change directory mapping table in ascending or descending lexicographical order. The operations of 1320 may be performed in accordance with examples disclosed herein. In some examples, aspects of the operations of 1320 may be performed by an entry comparing component 955, as described with reference to FIG. 9.

At 1325, the method may include identifying a set of descendent directories and a set of descendent files corresponding to the one or more directories that were renamed or deleted within the time period by iteratively comparing the sorted entries of the change directory mapping table to entries from a previous index file. The operations of 1325 may be performed in accordance with examples disclosed herein. In some examples, aspects of the operations of 1325 may be performed by a descendent identifying component 935, as described with reference to FIG. 9.

At 1330, the method may include updating a first set of path identifiers associated with the identified set of descendent directories and a second set of path identifiers associated with the identified set of descendent files based on the metadata from the multiple entries. The operations of 1330 may be performed in accordance with examples disclosed herein. In some examples, aspects of the operations of 1330 may be performed by a path updating component 940, as described with reference to FIG. 9.

At 1335, the method may include generating an updated index file based on updating the first set of path identifiers and the second set of path identifiers. The operations of 1335 may be performed in accordance with examples disclosed herein. In some examples, aspects of the operations of 1335 may be performed by an index file generating component 945, as described with reference to FIG. 9.

Figure 14:
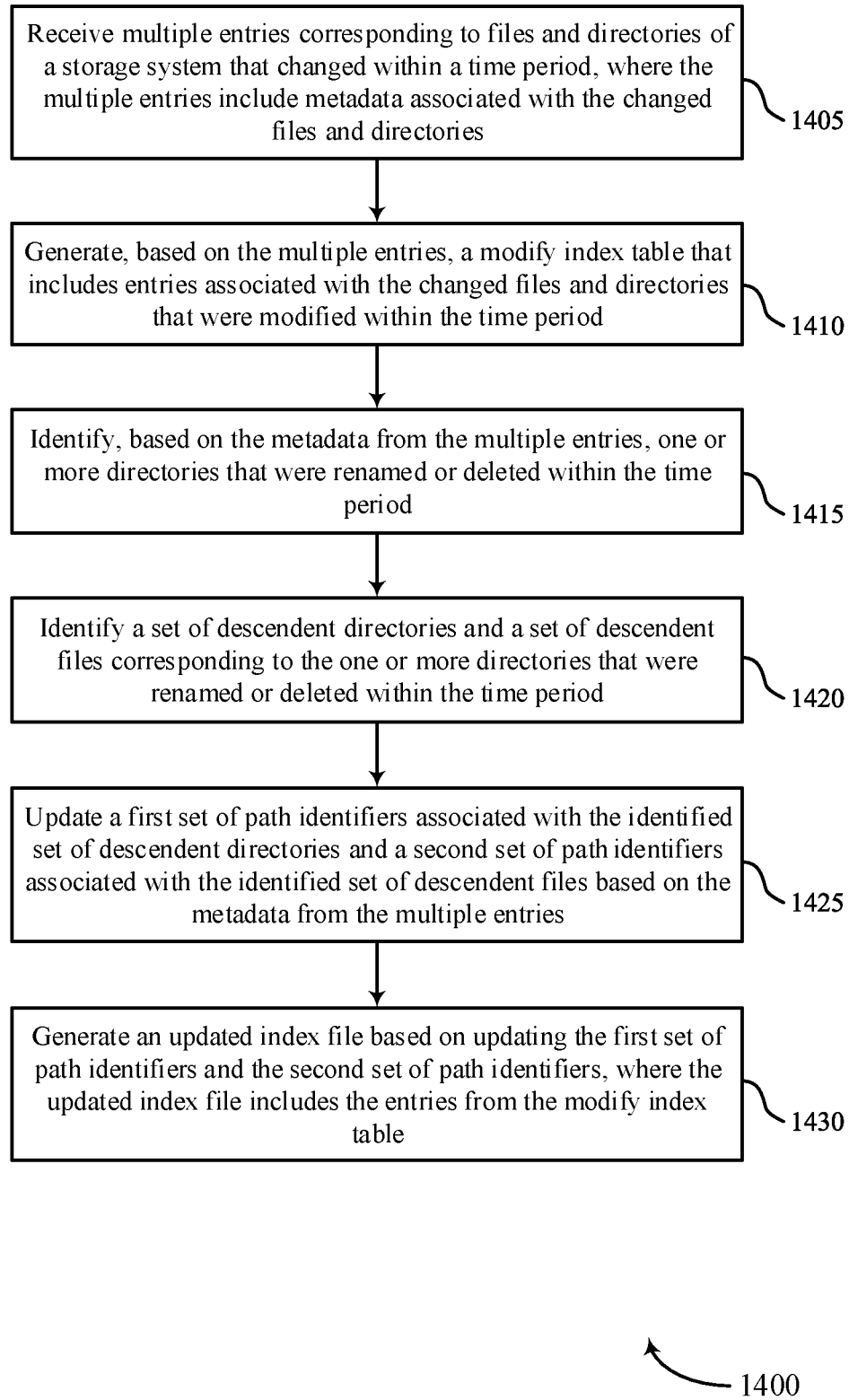

FIG. 14 shows a flowchart illustrating a method 1400 that supports identifying renames and deletions in a storage system according to one or more aspects of the present disclosure. The operations of the method 1400 may be implemented by a DMS or components thereof. For example, the operations of the method 1400 may be performed by a DMS 110, as described with reference to FIGS. 1 through 10. In some examples, a DMS may execute a set of instructions to control the functional elements of the DMS to perform the described functions. Additionally, or alternatively, the DMS may perform aspects of the described functions using special-purpose hardware.

At 1405, the method may include receiving multiple entries corresponding to files and directories of a storage system that changed within a time period, where the multiple entries include metadata associated with the changed files and directories. The operations of 1405 may be performed in accordance with examples disclosed herein. In some examples, aspects of the operations of 1405 may be performed by an entry receiving component 925, as described with reference to FIG. 9.

At 1410, the method may include generating, based on the multiple entries, a modify index table that includes entries associated with the changed files and directories that were modified within the time period. The operations of 1410 may be performed in accordance with examples disclosed herein. In some examples, aspects of the operations of 1410 may be performed by a table generating component 950, as described with reference to FIG. 9.

At 1415, the method may include identifying, based on the metadata from the multiple entries, one or more directories that were renamed or deleted within the time period. The operations of 1415 may be performed in accordance with examples disclosed herein. In some examples, aspects of the operations of 1415 may be performed by a directory identifying component 930, as described with reference to FIG. 9.

At 1420, the method may include identifying a set of descendent directories and a set of descendent files corresponding to the one or more directories that were renamed or deleted within the time period. The operations of 1420 may be performed in accordance with examples disclosed herein. In some examples, aspects of the operations of 1420 may be performed by a descendent identifying component 935, as described with reference to FIG. 9.

At 1425, the method may include updating a first set of path identifiers associated with the identified set of descendent directories and a second set of path identifiers associated with the identified set of descendent files based on the metadata from the multiple entries. The operations of 1425 may be performed in accordance with examples disclosed herein. In some examples, aspects of the operations of 1425 may be performed by a path updating component 940, as described with reference to FIG. 9.

At 1430, the method may include generating an updated index file based on updating the first set of path identifiers and the second set of path identifiers, where the updated index file includes the entries from the modify index table. The operations of 1430 may be performed in accordance with examples disclosed herein. In some examples, aspects of the operations of 1430 may be performed by an index file generating component 945, as described with reference to FIG. 9.

A method for data processing at a DMS is described. The method may include receiving multiple entries corresponding to files and directories of a storage system that changed within a time period, the multiple entries including metadata associated with the changed files and directories. The method may further include identifying, based on the metadata from the multiple entries, one or more directories that were renamed or deleted within the time period. The method may further include identifying a set of descendent directories and a set of descendent files corresponding to the one or more directories that were renamed or deleted within the time period. The method may further include updating a first set of path identifiers associated with the identified set of descendent directories and a second set of path identifiers associated with the identified set of descendent files based on the metadata from the multiple entries. The method may further include generating an updated index file based on updating the first set of path identifiers and the second set of path identifiers.

An apparatus for data processing at a DMS is described. The apparatus may include at least one processor, memory coupled with the at least one processor, and instructions stored in the memory. The instructions may be executable by the at least one processor to cause the apparatus to receive multiple entries corresponding to files and directories of a storage system that changed within a time period, the multiple entries including metadata associated with the changed files and directories. The instructions may be further executable by the at least one processor to cause the apparatus to identify, based on the metadata from the multiple entries, one or more directories that were renamed or deleted within the time period. The instructions may be further executable by the at least one processor to cause the apparatus to identify a set of descendent directories and a set of descendent files corresponding to the one or more directories that were renamed or deleted within the time period. The instructions may be further executable by the at least one processor to cause the apparatus to update a first set of path identifiers associated with the identified set of descendent directories and a second set of path identifiers associated with the identified set of descendent files based on the metadata from the multiple entries. The instructions may be further executable by the at least one processor to cause the apparatus to generate an updated index file based on updating the first set of path identifiers and the second set of path identifiers.

Another apparatus for data processing at a DMS is described. The apparatus may include means for receiving multiple entries corresponding to files and directories of a storage system that changed within a time period, the multiple entries including metadata associated with the changed files and directories. The apparatus may further include means for identifying, based on the metadata from the multiple entries, one or more directories that were renamed or deleted within the time period. The apparatus may further include means for identifying a set of descendent directories and a set of descendent files corresponding to the one or more directories that were renamed or deleted within the time period. The apparatus may further include means for updating a first set of path identifiers associated with the identified set of descendent directories and a second set of path identifiers associated with the identified set of descendent files based on the metadata from the multiple entries. The apparatus may further include means for generating an updated index file based on updating the first set of path identifiers and the second set of path identifiers.

A non-transitory computer-readable medium storing code for data processing at a DMS is described. The code may include instructions executable by at least one processor to receive multiple entries corresponding to files and directories of a storage system that changed within a time period, the multiple entries including metadata associated with the changed files and directories. The instructions may be further executable by the at least one processor to identify, based on the metadata from the multiple entries, one or more directories that were renamed or deleted within the time period. The instructions may be further executable by the at least one processor to identify a set of descendent directories and a set of descendent files corresponding to the one or more directories that were renamed or deleted within the time period. The instructions may be further executable by the at least one processor to update a first set of path identifiers associated with the identified set of descendent directories and a second set of path identifiers associated with the identified set of descendent files based on the metadata from the multiple entries. The instructions may be further executable by the at least one processor to generate an updated index file based on updating the first set of path identifiers and the second set of path identifiers.

Some examples of the methods, apparatuses, and non-transitory computer-readable media described herein may further include operations, features, means, or instructions for generating a change directory key table based on the multiple entries, where entries of the change directory key table include keys and values associated with the directories of the storage system that changed within the time period. In some examples, identifying the one or more directories that were renamed or deleted within the time period includes identifying two or more entries from the change directory key table that have correlated keys.

In some examples of the methods, apparatuses, and non-transitory computer-readable media described herein, the entries of the change directory key table may be sorted in ascending or descending order with respect to the keys.

Some examples of the methods, apparatuses, and non-transitory computer-readable media described herein may further include operations, features, means, or instructions for determining that the two or more entries correspond to a rename operation based on a first entry of the two or more entries corresponding to a delete operation and a second entry of the two or more entries corresponding to a create operation. In some examples, generating the updated index file includes adding a third entry to the updated index file based on the determining, where the third entry includes metadata from one or both of the first entry or the second entry.

In some examples of the methods, apparatuses, and non-transitory computer-readable media described herein, the keys may be derived from identification numbers associated with the directories of the storage system that changed within the time period, creation times associated with the directories of the storage system that changed within the time period, or both. In some examples, the values include path identifiers associated with the directories of the storage system that changed within the time period.

Some examples of the methods, apparatuses, and non-transitory computer-readable media described herein may further include operations, features, means, or instructions for retrieving a directory key file with entries that include keys associated with directories that were present in the storage system prior to the time period.

Some examples of the methods, apparatuses, and non-transitory computer-readable media described herein may further include operations, features, means, or instructions for comparing entries from the directory key file to entries from the change directory key table. In some examples, identifying the one or more directories that were renamed or deleted includes identifying, based on the comparing, a first entry from the directory key file and a second entry from the change directory key table that have correlated keys.

In some examples of the methods, apparatuses, and non-transitory computer-readable media described herein, the updated index file excludes entries associated with the changed files and directories that were deleted within the time period. In some examples, the updated index file includes entries associated with files and directories of the storage system that were unchanged within the time period, entries associated with the changed files and directories that were renamed within the time period, entries associated with the changed files and directories that were created within the time period, and entries associated with the changed files and directories that were modified within the time period.

Some examples of the methods, apparatuses, and non-transitory computer-readable media described herein may further include operations, features, means, or instructions for generating a change directory mapping table that includes entries associated with the one or more directories of the storage system that were renamed or deleted within the time period.

Some examples of the methods, apparatuses, and non-transitory computer-readable media described herein may further include operations, features, means, or instructions for sorting the entries of the change directory mapping table in ascending or descending lexicographical order. In some examples, identifying the set of descendent directories includes iteratively comparing the sorted entries of the change directory mapping table to entries from a previous index file.

In examples of the methods, apparatuses, and non-transitory computer-readable media described herein, the previous index file may be a base index file that includes entries associated with files and directories that were present in the storage system prior to the time period. In some examples, the previous index file may be a directory index file that includes entries associated with directories that were present in the storage system prior to the time period.

Some examples of the methods, apparatuses, and non-transitory computer-readable media described herein may further include operations, features, means, or instructions for determining that a first entry in the change directory mapping table and a second entry in the previous index file have identical path identifiers.

Some examples of the methods, apparatuses, and non-transitory computer-readable media described herein may further include operations, features, means, or instructions for adding a third entry to a derived path mapping table based on the determining, where the third entry includes metadata from one or both of the first entry or the second entry. In some examples, the set of descendent files may be identified using the derived path mapping table.

Some examples of the methods, apparatuses, and non-transitory computer-readable media described herein may further include operations, features, means, or instructions for retrieving a base index file that includes entries associated with files and directories that were present in the storage system prior to the time period.

Some examples of the methods, apparatuses, and non-transitory computer-readable media described herein may further include operations, features, means, or instructions for generating a derived path mapping table that includes entries associated with the one or more directories that were renamed or deleted and the identified set of descendent directories. In some examples, identifying the set of descendent files includes storing a first set of entries from the derived path mapping table in a data structure and iteratively comparing entries of the base index file to the first set of entries stored in the data structure, a second set of entries from the derived path mapping table, or a combination thereof.

Some examples of the methods, apparatuses, and non-transitory computer-readable media described herein may further include operations, features, means, or instructions for removing a current entry from the data structure after processing entries from the base index file that descend from the current entry.

Some examples of the methods, apparatuses, and non-transitory computer-readable media described herein may further include operations, features, means, or instructions for generating, based on the multiple entries, a modify index table that includes entries associated with the changed files and directories that were modified within the time period, where the updated index file includes the entries from the modify index table.

Some examples of the methods, apparatuses, and non-transitory computer-readable media described herein may further include operations, features, means, or instructions for generating, based on the multiple entries, a create index table that includes entries associated with the changed files and directories that were created within the time period, where the updated index file includes the entries from the create index table.

Some examples of the methods, apparatuses, and non-transitory computer-readable media described herein may further include operations, features, means, or instructions for generating, based on the multiple entries, a delete index table that includes entries associated with the changed files and directories that were deleted within the time period, where the updated index file excludes the entries from the delete index table.

Some examples of the methods, apparatuses, and non-transitory computer-readable media described herein may further include operations, features, means, or instructions for retrieving a base index file that includes entries associated with files and directories that were present in the storage system prior to the time period, where the updated index file includes entries from the base index file that were unchanged within the time period.

In some examples of the methods, apparatuses, and non-transitory computer-readable media described herein, the metadata indicates one or more of a file size, a file location, a permission status, a set of related directories or files, a creation time, a modification time, a user identifier, or a timestamp associated with the changed files and directories.

It should be noted that the methods described above describe possible implementations, and that the operations and the steps may be rearranged or otherwise modified and that other implementations are possible. Furthermore, aspects from two or more of the methods may be combined.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Further, a system as used herein may be a collection of devices, a single device, or aspects within a single device.

Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, EEPROM) compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for data processing at a data management system, comprising:
   receiving a plurality of entries corresponding to files and directories of a storage system that changed within a time period, wherein the plurality of entries comprise metadata associated with the changed files and directories;
   identifying, based at least in part on the metadata from the plurality of entries, one or more directories that were renamed or deleted within the time period;
   identifying a set of descendent directories and a set of descendent files corresponding to the one or more directories that were renamed or deleted within the time period;
   updating a first set of path identifiers associated with the identified set of descendent directories and a second set of path identifiers associated with the identified set of descendent files based at least in part on the metadata from the plurality of entries; and
   generating an updated index file based at least in part on updating the first set of path identifiers and the second set of path identifiers.

2. The method of claim 1, further comprising:
   generating a change directory key table based at least in part on the plurality of entries, wherein entries of the change directory key table comprise keys and values associated with the directories of the storage system that changed within the time period,
   wherein identifying the one or more directories that were renamed or deleted within the time period comprises identifying two or more entries from the change directory key table that have correlated keys.

3. The method of claim 2, wherein the entries of the change directory key table are sorted in ascending or descending order with respect to the keys.

4. The method of claim 2, further comprising:
   determining that the two or more entries correspond to a rename operation based at least in part on a first entry of the two or more entries corresponding to a delete operation and a second entry of the two or more entries corresponding to a create operation,
   wherein generating the updated index file comprises adding a third entry to the updated index file based at least in part on the determining, the third entry comprising metadata from one or both of the first entry or the second entry.

5. The method of claim 2, wherein:
   the keys are derived from identification numbers associated with the directories of the storage system that changed within the time period, creation times associated with the directories of the storage system that changed within the time period, or both; and
   the values comprise path identifiers associated with the directories of the storage system that changed within the time period.

6. The method of claim 2, further comprising:
   retrieving a directory key file with entries that include keys associated with directories present in the storage system prior to the time period; and
   comparing entries from the directory key file to entries from the change directory key table,
   wherein identifying the one or more directories that were renamed or deleted comprises identifying, based at least in part on the comparing, a first entry from the directory key file and a second entry from the change directory key table that have correlated keys.

7. The method of claim 1, wherein:
   the updated index file excludes entries associated with the changed files and directories that were deleted within the time period; and
   the updated index file includes entries associated with files and directories of the storage system that were unchanged within the time period, entries associated with the changed files and directories that were renamed within the time period, entries associated with the changed files and directories that were created within the time period, and entries associated with the changed files and directories that were modified within the time period.

8. The method of claim 1, further comprising:
   generating a change directory mapping table that includes entries associated with the one or more directories of the storage system that were renamed or deleted within the time period; and
   sorting the entries of the change directory mapping table in ascending or descending lexicographical order,
   wherein identifying the set of descendent directories comprises iteratively comparing the sorted entries of the change directory mapping table to entries from a previous index file.

9. The method of claim 8, wherein the previous index file comprises a base index file that includes entries associated with files and directories present in the storage system prior to the time period or a directory index file that includes entries associated with directories present in the storage system prior to the time period.

10. The method of claim 8, further comprising:
    determining that a first entry in the change directory mapping table and a second entry in the previous index file have identical path identifiers; and
    adding a third entry to a derived path mapping table based at least in part on the determining, wherein the third entry includes metadata from one or both of the first entry or the second entry, and wherein the set of descendent files are identified using the derived path mapping table.

11. The method of claim 1, further comprising:
    retrieving a base index file that includes entries associated with files and directories present in the storage system prior to the time period; and
    generating a derived path mapping table that includes entries associated with the one or more directories that were renamed or deleted and the identified set of descendent directories,
    wherein identifying the set of descendent files comprises storing a first set of entries from the derived path mapping table in a data structure and iteratively comparing entries of the base index file to the first set of entries stored in the data structure, a second set of entries from the derived path mapping table, or a combination thereof.

12. The method of claim 11, further comprising:
removing a current entry from the data structure after processing entries from the base index file that descend from the current entry.

13. The method of claim 1, further comprising:
generating, based at least in part on the plurality of entries, a modify index table that includes entries associated with the changed files and directories that were modified within the time period, wherein the updated index file includes the entries from the modify index table.

14. The method of claim 1, further comprising:
generating, based at least in part on the plurality of entries, a create index table that includes entries associated with the changed files and directories that were created within the time period, wherein the updated index file includes the entries from the create index table.

15. The method of claim 1, further comprising:
generating, based at least in part on the plurality of entries, a delete index table that includes entries associated with the changed files and directories that were deleted within the time period, wherein the updated index file excludes the entries from the delete index table.

16. The method of claim 1, further comprising:
retrieving a base index file that includes entries associated with files and directories present in the storage system prior to the time period, wherein the updated index file includes entries from the base index file that were unchanged within the time period.

17. The method of claim 1, wherein the metadata indicates one or more of a file size, a file location, a permission status, a set of related directories or files, a creation time, a modification time, a user identifier, or a timestamp associated with the changed files and directories.

18. An apparatus for data processing at a data management system, comprising:
  at least one processor;
  memory coupled with the at least one processor; and
  instructions stored in the memory and executable by the at least one processor to cause the apparatus to:
    receive a plurality of entries corresponding to files and directories of a storage system that changed within a time period, wherein the plurality of entries comprise metadata associated with the changed files and directories;
    identify, based at least in part on the metadata from the plurality of entries, one or more directories that were renamed or deleted within the time period;
    identify a set of descendent directories and a set of descendent files corresponding to the one or more directories that were renamed or deleted within the time period;
    update a first set of path identifiers associated with the identified set of descendent directories and a second set of path identifiers associated with the identified set of descendent files based at least in part on the metadata from the plurality of entries; and
    generate an updated index file based at least in part on updating the first set of path identifiers and the second set of path identifiers.

19. The apparatus of claim 18, wherein the instructions are further executable by the at least one processor to cause the apparatus to:
generate a change directory key table based at least in part on the plurality of entries, wherein entries of the change directory key table comprise keys and values associated with the directories of the storage system that changed within the time period,
wherein the instructions to identify the one or more directories that were renamed or deleted within the time period are executable by the at least one processor to identify two or more entries from the change directory key table that have correlated keys.

20. The apparatus of claim 18, wherein the instructions are further executable by the at least one processor to cause the apparatus to:
generate a change directory mapping table that includes entries associated with the one or more directories of the storage system that were renamed or deleted within the time period; and
sort the entries of the change directory mapping table in ascending or descending lexicographical order,
wherein the instructions to identify the set of descendent directories are executable by the at least one processor to iteratively compare the sorted entries of the change directory mapping table to entries from a previous index file.

* * * * *